United States Patent
Shimizu et al.

[11] Patent Number: 5,932,144
[45] Date of Patent: Aug. 3, 1999

[54] SOLUBLE ANILINE CONDUCTING POLYMERS

[75] Inventors: Shigeru Shimizu; Takashi Saitoh; Masashi Uzawa; Yasuyuki Takayanagi, all of Yokohama, Japan

[73] Assignee: Mitsubishi Rayon Co., Ltd., Tokyo, Japan

[21] Appl. No.: 08/916,333

[22] Filed: Aug. 22, 1997

Related U.S. Application Data

[62] Division of application No. 08/700,994, Aug. 21, 1996, Pat. No. 5,700,399, which is a division of application No. 08/361,577, Dec. 22, 1994, Pat. No. 5,589,108.

[30] Foreign Application Priority Data

| Dec. 29, 1993 | [JP] | Japan | 5-353698 |
| Apr. 4, 1994 | [JP] | Japan | 6-89091 |
| Jul. 13, 1994 | [JP] | Japan | 6-183882 |
| Aug. 1, 1994 | [JP] | Japan | 6-199051 |

[51] Int. Cl.$^6$ .............. H01B 1/12; C08G 65/38
[52] U.S. Cl. .............. 252/500; 252/518.1; 528/210; 528/422
[58] Field of Search .............. 252/500, 518.1; 528/210, 214, 422

[56] References Cited

U.S. PATENT DOCUMENTS

| 4,956,441 | 9/1990 | Kathirgamanthan et al. | 528/171 |
| 5,109,070 | 4/1992 | Epstein et al. | 525/189 |
| 5,115,057 | 5/1992 | Ono et al. | 526/256 |
| 5,208,301 | 5/1993 | Epstein et al. | 525/540 |
| 5,256,454 | 10/1993 | Mural et al. | 427/498 |
| 5,437,893 | 8/1995 | Mural et al. | 427/498 |
| 5,531,932 | 7/1996 | Kärnä et al. | 252/578 |
| 5,560,870 | 10/1996 | Watanabe et al. | 252/500 |

FOREIGN PATENT DOCUMENTS

| 0096319 | 12/1983 | European Pat. Off. . |
| 0253594 | 1/1988 | European Pat. Off. . |
| 4244360 | 7/1993 | Germany . |

(List continued on next page.)

OTHER PUBLICATIONS

Flexible Polyaniline, Akira Kitani et al., Journal of Polymer Science: Part A: Polymer Chemistry, vol. 26, pp. 1531–1539 (1988) (No Month).

The Chemical Society of Japan, vol. 6, pp. 1224–1130, 1985, Rafael Vasquez (No Month).

Preprint of the 64th Autumn Annual Meeting of Nihon Kogaku–kai, vol. II, 706 (1992) (No Month).

Effect of Sulfonic Acid Group on Polyaniline Backbone, J. Am. Chem. Soc., 1991, 113, pp. 2665–2671 (No Month).

A Novel N–Substituted Polyaniline Derivative, Polymer, 1993, vol. 34, No. 1, pp. 158–162 (No Month).

Yue et al., "Effect of Sulfonic Acid Group on Polyaniline Backbone", J. Am. Chem. Soc. (1991) 113:2665–2671. (No Month).

*Primary Examiner*—Mark Kopec
*Attorney, Agent, or Firm*—Pillsbury, Madison & Sutro LLP

[57] ABSTRACT

A soluble aniline conducting polymer characterized in that said conductive polymer comprises as a repeating unit an alkoxyl group-substituted aminobenzenesulfonic acid, its alkali metal salts, ammonium salts and/or substituted ammonium salts, and is a solid having a weight average molecular weight of about 1900 or more at room temperature, a conductive composition and electric conductor comprising the same, and a method for producing a soluble aniline conducting polymer having a weight average molecular weight of 10,000 t 3,240,000 characterized by polymerizing at least one compound (1) selected from the group consisting of an acidic group-substituted aniline, its alkali metal salts, ammonium salts and substituted ammonium salts in a solution containing a basic compound (2) using an oxidizing agent.

22 Claims, 8 Drawing Sheets

FOREIGN PATENT DOCUMENTS

| | | |
|---|---|---|
| 44-16499 | 7/1969 | Japan . |
| 50-123750 | 9/1975 | Japan . |
| 54-130651 | 11/1979 | Japan . |
| 60-235831 | 11/1985 | Japan . |
| 61-197633 | 9/1986 | Japan . |
| 63-39916 | 2/1988 | Japan . |
| 1-163263 | 6/1989 | Japan . |
| 1-210470 | 8/1989 | Japan . |
| 63-181962 | 12/1989 | Japan . |
| 2-166165 | 6/1990 | Japan . |
| 3-285983 | 12/1991 | Japan . |
| 4-32848 | 2/1992 | Japan . |
| 4-268331 | 9/1992 | Japan . |
| 4-328181 | 11/1992 | Japan . |
| 5-503953 | 6/1993 | Japan . |
| 5-226238 | 9/1993 | Japan . |
| 6-3813 | 1/1994 | Japan . |
| 6-56987 | 3/1994 | Japan . |
| 6-145386 | 5/1994 | Japan . |
| 91/05979 | 5/1991 | WIPO . |
| 91/06887 | 5/1991 | WIPO . |

SOLUBLE ANILINE CONDUCTING POLYMERS

This is a division of application Ser. No. 08/700,994, filed Aug. 21, 1996 U.S. Pat. No. 5,700,399, which is a division of 8/361,577 filed Dec. 22, 1994 now U.S. Pat. No. 5,589,108.

BACKGROUND OF THE INVENTION

1. Field of the Invention

The present invention relates to a solvent-soluble aniline conducting polymer, a method for producing the same, a conductive composition with the same, an electric conductor formed from the conductive composition and a method for producing the same. A solution and conductive composition produced from the polymer of the present invention can be applied to various uses for static charging prevention by simple techniques such as coating, spraying, casting, dipping and the like.

The electric conductor of the present invention obtained from the above conductive composition can be used in various uses described below:

Industrial packing materials for semiconductors, electric and electronic parts, etc.; static charging preventing films for recording materials for electrophotography such as films for overhead projectors, slide films, etc.; static charging prevention for magnetic recording tapes such as audio-tapes, video-tapes, tapes for computers, floppy discs, etc.; static charging prevention for the surface of input and display devices such as transparent touch panels, electroluminescence displays, liquid crystal displays and the like; and transparent conductive films or glass used as a transparent electrode, various kinds of sensor, etc.

2. Description of the Related Art

A doped polyaniline (conducting polymer) is well known, but it is insoluble in most solvents, so that it has difficulties in molding and fabricating. A method of polymerizing aniline by electrolytic oxidation [Japanese Patent Application Kokai No. 60-235831; J. Polymer Sci. Polymer Chem. Ed., 26, 1531 (1988)] can form a polyaniline film on an electrode, but it has problems that the isolation of the film is troublesome and also mass synthesis is difficult.

In recent years, there are proposed an alkali-soluble sulfonated polyaniline which develops conductivity without addition of doping agents, its synthesis method, a carboxylated polyaniline and its synthesis method.

For example, the following methods are known as synthesis methods for the sulfonated polyaniline; A method of synthesizing a sulfonated polyaniline electrochemically polymerizing aniline and m-aminobenzenesulfonic acid (Nihon Kagaku-kaishi, 1985, 1124; Japanese Patent Application Kokai No. 02-166165); a method of synthesizing a sulfonated polyaniline by electrochemically polymerizing each alone of o-, m- and p-aminobenzenesulfonic acids [Preprint of the 64th Autumn Annual Meeting of Nihon Kagaku-kai, Vol. II, 706 (1992)]; a method of synthesizing a sulfonated polyaniline by chemically polymerizing aniline and o- and m-aminobenzenesulfonic acids (Japanese Patent Application Kokai No. 01-301714); a method of polymerizing a monomer containing an aminobenzenesulfonic acid compound or that compound and an aniline compound by chemical oxidation (Japanese Patent Application Kokai No. 6-56987); a method of sulfonating with conc. sulfuric acid an emeraldine-type polymer (polyaniline) obtained by chemical or electrochemical polymerization (EP 96319); a method of sulfonating with a sulfuric anhydride/triethyl phosphate complex (Japanese Patent Application Kokai No. 61-197633); a method of sulfonating with a fuming sulfuric acid [J. Am. Chem. Soc., (1991)113, 2665–2671; J. Am. Chem. Soc., (1990)112, 2880; WO91-05979, WO91-06887; Japanese Patent Application Kokai No. 6-145386]; a method of synthesizing an N-substituted sulfonated polyaniline by chemically polymerizing diphenylamine-4-sulfonic acid (sodium salt) [Polymer, (1993)34, 158–162], and the like.

The above method of synthesizing a sulfonated polyaniline by electrochemically polymerizing aniline and m-aminobenzenesulfonic acid (Nihon Kagaku-kaishi, 1985, 1124; Japanese Patent Application Kokai No. 02-166165 and EP-253595) forms a product on an electrode, so that it has problems that an isolation operation is troublesome and also mass synthesis is difficult.

In the above-mentioned Preprint of the 64th Autumn Annual Meeting of Nihon Kagaku-kai, Vol. II, 706 (1992), there is reported a method of synthesizing a soluble conducting polymer by electrolytic oxidation of an aminobenzenesulfonic acid, but it is also difficult to say that this method is suitable for mass synthesis, and further a problem still remains in the performance of the resulting polymer. Also, there is a description that the desired product was not obtained when the chemical oxidation polymerization of an aminobenzenesulfonic acid was carried out with ammonium peroxodisulfate as an oxidizing agent. In J. Am.. Chem. Soc., (1991)113, 2665–2671, there is a description that chemical and electrochemical polymerizations of o- and m-aminobenzenesulfonic acids were tried with no success.

In Japanese Patent Application Kokai No. 6-56987, there is a description that a water-soluble conducting polymer is obtained by carrying out the chemical oxidation polymerization of a monomer containing an aminobenzenesulfonic acid compound, or that compound and an aniline compound, in any of acidic, neutral and alkaline solutions.

However, the present inventors' investigation shows that, in order to obtain a polymer having a sufficiently high molecular weight for film formation, it is an essential condition to carry out the polymerization in the presence of a basic compound, and that such a high molecular weight polymer cannot be obtained in acidic and neutral solutions.

In Japanese Patent Application Kokai No. 6-56987, all the examples describe polymerization in a sulfuric acid-containing acidic solution, not in an alkaline solution. Even in examples describing the polymerization in an acidic aqueous solution, there are no data on the molecular weight, so that any physical properties of the polymers obtained are not clear.

Further, the present inventors tried the polymerization in a protonic acid-containing aqueous solution and a simple aqueous solution using ammonium peroxodisulfate as an oxidizing agent. As a result, a water-soluble polymer was obtained, but its molecular weight was so low that such a practical polymer that forms a film was not obtained.

The present inventors traced the method described in Japanese Patent Application Kokai No. 01-301714, wherein aniline and m-aminobenzenesulfonic acid are chemically polymerized using ammonium peroxodisulfate, and the method described in Japanese Patent Application Kokai No. 6-56987, wherein aniline and m-aminobenzenesulfonic acid are chemically polymerized using potassium permanganate. It was found, however, that about only one sulfonic group per five aromatic rings was introduced, and that the resulting polymer showed a high conductivity, but it was completely insoluble in neutral and acidic water and almost insoluble in alkaline aqueous solutions such as aqueous ammonia. Also, when sulfonation is carried out by a method described in Japanese Patent Application Kokai No. 61-197633, about only one sulfonic group per five aromatic rings is introduced as described in page 7 of that literature, because the solubility of polyaniline in a sulfonation solvent is not so sufficient that the reaction is carried out in a dispersion state. The sulfonated polyaniline thus obtained has an introduced sulfonic group at only a low rate and has problems of the conductivity and solubility being not sufficient.

Also, according to J. Am. Chem. Soc., (1991)113, 2665–2671 and J. Am. Chem. Soc., (1990)112, 2800, it is described that when a polyaniline is sulfonated with fuming sulfuric acid, about one sulfonic group per two aromatic rings is introduced. When, however, sufficient sulfonation of polyaniline is tried by this method, a large excess of fuming sulfuric acid is required because the solubility of polyaniline in fuming sulfuric acid is not sufficient. Also, there is a problem that the polymer is easy to solidify when polyaniline is added to fuming sulfuric acid. These problems make a manufacturing process troublesome, and increase the cost of the final product. Further, the polymer and sulfonated product synthesized by the above methods have problems that they are insufficient in conductivity, and that they are soluble in aqueous solutions containing a base (e.g. ammonia, alkylamine), but insoluble in water itself.

According to Polymer (1993)34, 158–162, it is described that when diphenylamine-4-sulfonic acid (sodium salt) is polymerized, an N-substituted sulfonated polyaniline in which one benzenesulfonic group has been introduced into the aniline skeleton is obtained, and that this product is soluble in water itself, but supercentrifugation operation is necessary to isolate the resulting polymer. The present inventors traced this method to find that since this polymer has a high solubility, the yield of the polymer from the polymerization solvent is low, and therefore that when a high-speed centrifugation operation is not applied, the polymer cannot be isolated. Also, it was found that since this polymer is of an N-substituted type, the conductivity of this polymer is low as compared with a polymer synthesized by a method described in J. Am. Chem. Soc., (1991)113, 2665–2671.

Also, a synthesis method for a carboxylated polyaniline is proposed, in which 2- or 3-carboxyaniline or its salt is oxidation polymerized, and the resulting product is treated with a basic substance to obtain the carboxyl group in the form of salt (Japanese Patent Application Kokai No. 4-268331). In this method, the amount of the oxidizing agent required is twice or more by equivalent that of the raw material, and also the value of conductivity is low. This is considered to show that the reactivity of the monomer is low, and therefore a low molecular weight polymer is produced.

Also, a synthetic method is proposed in which methyl anthranilate (anthranilic acid methyl ester) is polymerized in an aqueous acidic solvent in the presence of ammonium peroxodisulfate, and then the methyl ester is saponified with alcoholic potassium hydroxide (Japanese Patent Application Kokai No. 5-226238). This reaction is carried out in two steps, so that operation is very troublesome.

Further, the present inventors tried polymerization of 2-carboxyaniline in a protonic acid-containing aqueous solution using ammonium peroxodisulfate as an oxidizing agent, but the product could not be obtained. Also, the present inventors tried polymerization of aniline and 2-carboxyaniline in a protonic acid-containing aqueous solution using ammonium peroxodisulfate as an oxidizing agent, but the copolymer obtained was low in both solubility and conductivity. This is considered to show that the proportion of copolymerized 2-carboxyaniline in the copolymer obtained is low.

When formability such as film formation by coating is taken into account, in order that coating onto, particularly, any of hydrophilic and hydrophobic base materials may be possible, it is desired to have solubility in both water and organic solvents. However, the sulfonated product of polyaniline has solubility in an alkali water, but it is insoluble in neutral to acidic aqueous solutions, and also its solubility in organic solvents is not sufficient.

As a method to solve these various problems, the present inventors proposed a method for producing the sulfonated product of aniline copolymers characterized in that at least one compound selected from the group consisting of aniline, N-alkylaniline and phenylenediamines is copolymerized with aminobenzenesulfonic acid in acidic solvents using an oxidizing agent, and then the resulting copolymer is sulfonated with a sulfonating agent (DE-4244360). The resulting anilne conducting polymer contains a sulfonic acid group in a rate of 15 to 80% based on the total aromatic rings. However, this method also requires sulfonation operation in conc. sulfuric acid, so that treatment of the waste acid remains as a serious problem. Further, there is a problem of the resulting copolymer being insoluble in water itself.

Any of the copolymers synthesized by the above methods is presumed to have a structure represented by the following formula (9),

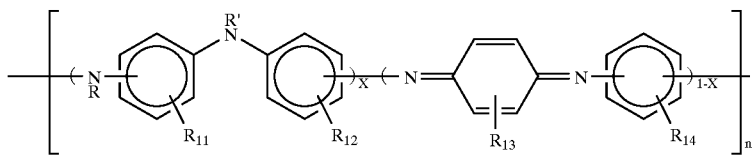

(9)

wherein each of $R_{11}$, $R_{12}$, $R_{13}$ and $R_{14}$ is selected from the group consisting of hydrogen and a sulfonic acid group, $R_1$ is selected from the group consisting of hydrogen and a $C_1$–$C_4$ alkyl group, the rate of sulfonic acid groups is 40 to 80% based on the aromatic ring, X represents a number of from 0 to 1, and n represents a number of from 2 to 1500 showing a polymerization degree.

The polymerization solvent used in the above chemical polymerization is water or aqueous solutions containing a protonic acid. For example, the foregoing Japanese Patent Application Kokai No. 1-163263 describes that when ammonium peroxodisulfate is used as an oxidizing agent, it is desirable to contain a protonic acid having a pKa of, particularly, 3 or less, and that in the polymerization of aniline, those which can dissolve aniline, a protonic acid and oxidizing agent and also are not oxidized by the oxidizing agent are used as a solvent. Also, in Example 3 of the foregoing Japanese Patent Application Kokai No. 4-268331, oxidation polymerization is carried out by dissolving 4 g of sodium anthranilate in 100 ml of water and then adding a solution of 22.7 g of ammonium peroxodisulfate in 100 ml of water to the above aqueous anthranilic acid solution. The pH of this polymerization solvent is also nearly neutral, and it did not occur to anybody from the properties of the polymerization system to positively make alkaline the polymerization solvent and oxidation polymerization system from the standpoint of improvement in the reactivity of the monomer.

A method disclosed in Japanese Patent Application Kokai No. 4-268331 requires a step for treating a product with a basic substance after oxidation polymerization. Japanese Patent Application Kokai No. 6-56987 describes that in polymerization in alkaline systems, an additional acid treatment step is required in order to make the resulting polymer highly conductive. However, the method of the present invention requires such no aftertreatment step, so that there is a merit that the manufacturing process can be reduced by one step.

Examples of the conductive components of the conventional conductive compositions include conducting polymers such as 7,7,8,8-tetracyanoquinodimethane (TCNQ) complex, polyaniline, etc., those using a metallic powder or carbon powder and a surface active agent, and compositions produced by combining these components and polymer compounds. Examples of the known electric conductors include those formed on a base material using conductive paints comprising the foregoing compositions.

For example, a method of forming metal thin films comprising gold, platinum, etc. and metal oxide thin films comprising indium tin oxide (ITO), etc. on base materials (e.g. plastic film, glass) using an ion beam sputtering apparatus or vacuum deposition apparatus, is known as a method of obtaining electric conductors having excellent transparency and conductivity. However, the apparatus used to form the thin films are expensive, and yet noble metals (e.g. gold, platinum), ITO, etc. used as a material are also expensive, so that there is a problem that the resulting electric conductors become also expensive.

The presently known electron-conductive high-molecular electric conductors with TCNQ include those comprising a polymer compound having a quaternary nitrogen-containing cationic group and TCNQ. These electric conductors are very poor in solubility in solvents, and many of them are soluble only in special solvents such as dimethylformamide, etc. It is therefore difficult to say that these electric conductors are suitable as a varnish.

Conducting polymer compositions comprising a polymer compound and the organic low-molecular complex of TCNQ. are proposed (Japanese Patent Application Kokoku No. 44-16499, and Japanese Patent Application Kokai No. 50-123750, No. 54-130651 and No. 1-210470). As to electric conductors obtained by this method, it is thought that the crystals of the TCNQ complex grow in the polymer compound, and that the conductivity of the electric conductors more improves as the degree of overlapping of these crystals becomes larger. However, the state of this crystal growth is easily affected by the rate of volatilization of a solvent and temperature distribution at the time of drying. Therefore, the number of conductive passages per unit area becomes non-uniform to make the dispersion of surface resistance large, so that uniform surface resistance cannot be obtained. Besides, if there is even a slight deterioration of the points of bonding of the crystals in high-temperature conditions (e.g. heating to 140° C.) or high-temperature high-humidity conditions (e.g. 60°×95% RH), there occurs a problem that the number of the conductive passages largely reduces and the conductivity also largely reduces.

A doped polyaniline (conducting polymer) is well known, but it is insoluble in most solvents, so that it has difficulties in molding and fabricating. A method of polymerizing aniline by electrolytic oxidation [Japanese Patent Application Kokai No. 60-235831; J. Polymer Sci. Polymer Chem. Ed., 26, 1531 (1988)] can form a polyaniline film on an electrode, but it has problems that the isolation of the film is troublesome and also mass synthesis is difficult.

On the other hand, there is a report on conductive compositions comprising a polyaniline in an undoped state obtained by chemical oxidation polymerization of aniline and the ammonium salt of a protonic acid having an acid dissociation constant, pKa, of 4.8 or less (Japanese Patent Application Kokai No. 3-285983). However, the polyaniline in the undoped state is soluble only in special solvents such as N-methyl-2-pyrrolidone, so that it is difficult to say that the polyaniline is suitable for a varnish.

Further, the foregoing electric conductor is formed with organic solvents, so that when these solvents are a dangerous substance having properties such as inflammability, explosiveness, etc., there are problems such as safety to working environments and the like. Further, with an increasing interest in safety to human body with respect to the toxicity of solvents and environmental problem on the earth, regulations on various organic solvents exerting adverse effects on human body and environment are being strengthened, so that the safety of conductive compositions is also becoming a serious problem.

In recent years, there are proposed an alkali-soluble sulfonated polyaniline developing conductivity without addition of dopants and its synthesis method, and conductive compositions with it are also reported. For example, conductive compositions comprising the above alkali-soluble sulfonated polyaniline and a polymer compound are reported (US 510970). However, the polymer compound used is poly(1,4-benzamide) resins, polyimide resins, etc. which are extremely low in solubility in organic solvents, and also sulfuric acid, etc. are used as a solvent. Therefore there remains a serious problem in using the compositions as ones for varnish. Also, conductive compositions with such an aniline conducting polymer as described hereinbefore are known. Since, however, the polymer itself has difficult points, use as conductive compositions is also a question.

The electric conductor comprising a carbon powder or metallic powder and a polymer compound is excellent in durability of coating film, but there is a problem that the coating film lacks transparency. Electric conductors are known in which conductivity has been given the surface of their plastic film by kneading a translucent anionic, cationic, nonionic or amphoteric surface active agent into the film, or coating the agent onto the surface of the film, thereby giving hydrophilic property and ionic property. Since, however, the electric conductor obtained by this method is ion-conductive, there are problems that the ion conductivity is subject to the effect of humidity in the atmosphere, and also that conductivity, i.e. the surface resistance per unit area, cannot be made $10^8$ Ω/o or less.

SUMMARY OF THE INVENTION

An object of the present invention is to provide a soluble aniline conducting polymer which develops a high conductivity, shows excellent solubility in water having any pH or organic solvents and has an improved coating property.

Another object of the present invention is to provide a conductive composition having no temperature dependence, developing a high conductivity and having excellent film-forming property, moldability and transparency, and an electric conductor having a small dispersion of surface resistance.

The present inventors have extensively studied a method for producing acidic group-substituted polyanilines in which the acidic group has been introduced at a high rate in order to obtain a high conductivity and solubility, the example of such acidic group-substituted polyanilines including a sulfonated polyaniline in which the ratio of the introduced sulfonic group to the aromatic ring is large, and a carboxylated polyaniline in which the ratio of the introduced carboxyl group to the aromatic ring is large. As a result, the present inventors have found that when an acidic group-substituted aniline such as a sulfonic acid group-substituted aniline or a carboxyl group-substituted aniline is polymerized using an oxidizing agent in a basic compound-containing solution, that is, an alkaline polymerization solution, surprisingly, the reactivity remarkably improves, and a polymer having a high molecular weight can be produced from the conventional anilines having a sulfonic or carboxyl group, contrary to an established theory that chemical oxidation polymerization of such anilines is difficult by themselves. Besides, the resulting conducting polymer shows a high conductivity, dissolves in aqueous solutions having any pH from an acid to alkali, particularly dissolves in water itself, and further shows excellent solubility in organic solvents such as alcohols.

The present invention relates to a soluble aniline conducting polymer characterized by being a polymer having as a repeating unit an alkoxyl group-substituted aminobenzenesulfonic acid, its alkali metal salt, ammonium salt and/or substituted ammonium salt, and being a solid having a weight average molecular weight of about 1900 or more at room temperature.

The present invention relates to a conductive composition comprising a water-soluble aniline conducting polymer (a) and a solvent (b), or the above components (a) and (b) and at least one polymer compound (c) selected from the group consisting of water-soluble polymer compounds and polymer compounds which form an emulsion in an aqueous system, and/or at least one nitrogen-containing compound (d) selected from the group consisting of amines and quaternary ammonium salts.

Also, the present invention relates to an electric conductor comprising a transparent conducting polymer film comprising a water-soluble aniline conducting polymer (a), or that polymer (a) and at least one polymer compound (c) selected from the group consisting of water-soluble polymer compounds and polymer compounds which form an emulsion in an aqueous system, and/or a surface active agent (e).

Also, the present invention relates to a method for producing an electric conductor comprising coating the following conductive composition (i), (ii) or (iii), for example, onto at least one surface of a base material to form a transparent conducting polymer film, and allowing the film to stand at room temperature or heat-treating the film to remove the components (b) and (d) by volatilization, the above conductive composition (i) comprising a water-soluble aniline conducting polymer (a) and a solvent (b); the above conductive composition (ii) comprising the components (a) and (b), at least one polymer compound (c) selected from the group consisting of water-soluble polymer compounds and polymer compounds which form an emulsion in aqueous systems, and/or at least one nitrogen-containing compound (d) selected from the group consisting of amines and quaternary ammonium salts; and the above conductive composition (iii) comprising the foregoing composition (i) or (ii) and a surface active agent (e).

Also, the present invention relates to a method for producing a soluble aniline conducting polymer characterized in that at least one compound (1) selected from the group consisting of an acidic group-substituted aniline, its alkali metal salts, ammonium salts and substituted ammonium salts is polymerized with the aid of an oxidizing agent in a solution containing a basic compound (2).

PREFERRED EMBODIMENTS OF THE INVENTION

Figure 1:
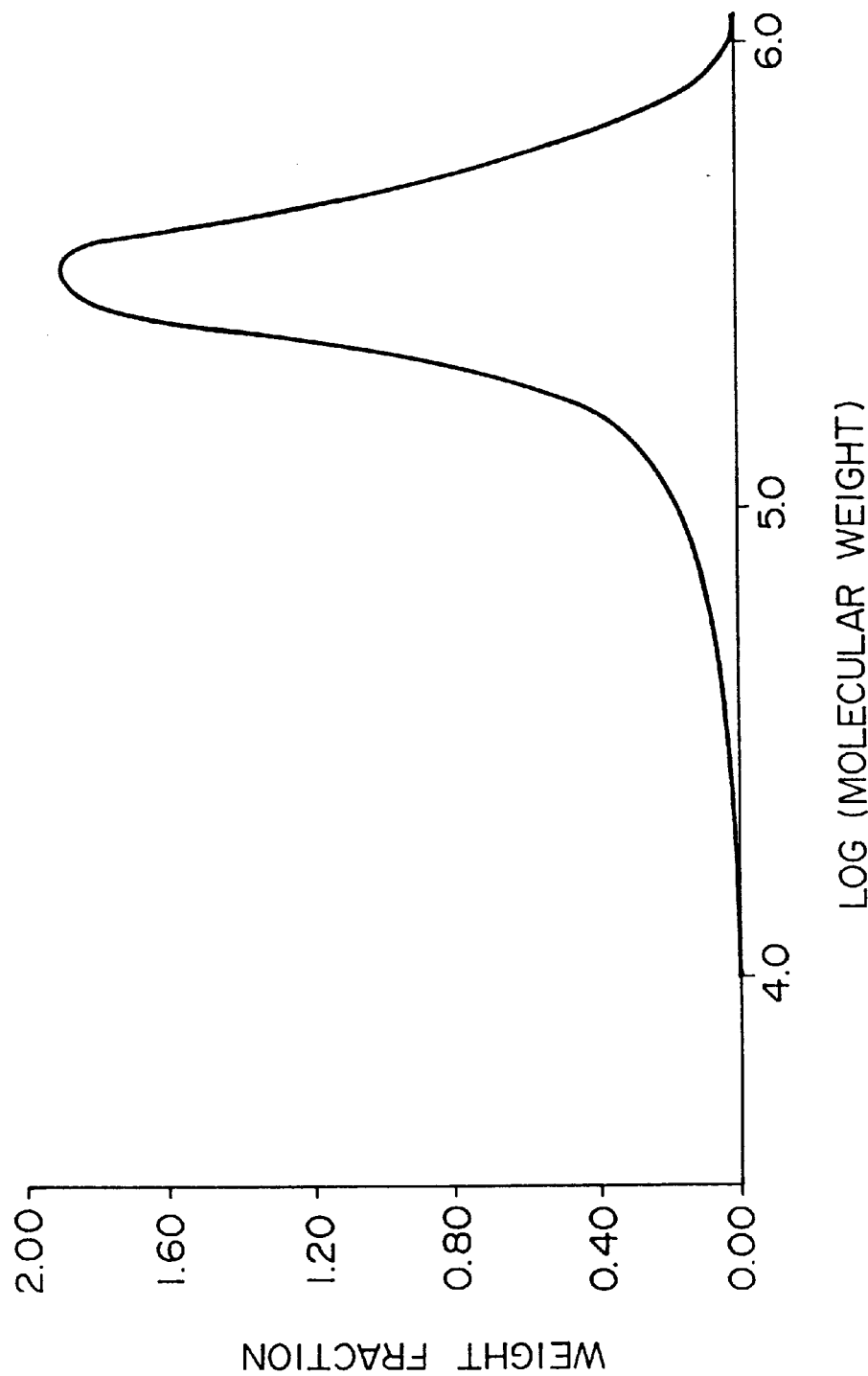
FIG. 1 is a chart obtained in the measurement of the molecular weight of the conducting polymer synthesized in Example 1.

The soluble aniline conducting polymer of the present invention contains as a repeating unit an alkoxyl group-substituted aminobenzenesulfonic acid, its alkali metal salt, ammonium salt and/or substituted ammonium salt, and it is a solid having a weight average molecular weight of about 1900 or more at room temperature.

Also, the soluble aniline conducting polymer of the present invention is a polymer containing a repeating unit represented by the formula (1),

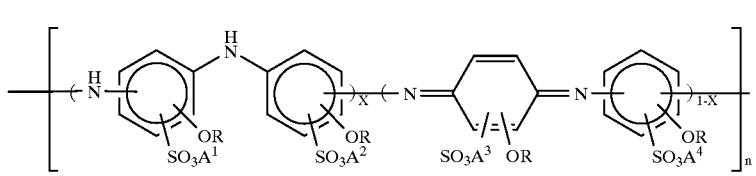
(1)

wherein each of $A^1$, $A^2$, $A^3$ and $A^4$ is a group independently selected from the group consisting of hydrogen, an alkali metal, an ammonium group and a substituted ammonium, R represents a $C_1$–$C_{12}$ straight-chain or branched alkyl group, x represents a number of from 0 to 1, and n represents a polymerization degree which is a number of from 3 to 5000, and it can also be expressed as a soluble aniline conducting polymer which is a solid having a weight average molecular weight of about 1900 or more at room temperature. This polymer has a surface resistance not more than an order of $10^8$ Ω/o (measured at a film thickness of 0.1 μm), and exhibits excellent characteristics that it shows solubility to acidic solutions as described alter.

The alkali metal includes lithium, sodium, potassium, etc.

The substituted ammonium includes aliphatic ammoniums, cyclic saturated ammoniums, cyclic unsaturated ammoniums, etc.

The foregoing aliphatic ammoniums are represented by the following formula,

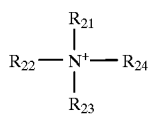

wherein each of $R_{21}$ to $R_{24}$ is a group independently selected from the group consisting of hydrogen, a $C_1$–$C_4$ alkyl group, $CH_2OH$ and $CH_2CH_2OH$. For example, there are given methyl ammonium, dimethyl ammonium, trimethyl ammonium, ethyl ammonium, diethyl ammonium, triethyl ammonium, methylethyl ammonium, diethymethyl ammonium, dimethylethyl ammonium, propyl ammonium, dipropyl ammonium, isopropyl ammonium, diisopropyl ammonium, butyl ammonium, dibutyl ammonium, methylpropyl ammonium, ethylpropyl ammonium, methylisopropyl ammonium, ethyl-isopropyl ammonium, methylbutyl ammonium, ethylbutyl ammonium, tetramethyl ammonium, tetramethylol ammonium, tetraethyl ammonium, tetra-n-butyl ammonium, tetra-sec-butyl ammonium, tetra-tert-butyl ammonium and the like. Of these ammoniums, those in which one of $R_{21}$ to $R_{24}$ is hydrogen, and other three are a $C_1$–$C_4$ alkyl group are most preferred, and those in which two of $R_{21}$ to $R_{24}$ are hydrogen, and other two are a $C_1$–$C_4$ alkyl group are preferred next to the former.

The cyclic saturated ammoniums include piperidinium, pyrrolidinium, morpholinium, piperazinium, derivatives having these skeletons, and the like.

The cyclic unsaturated ammoniums include pyridinium, α-picolinium, β-picolinium, γ-picolinium, quinolinium, isoquinolinium, pyrrolinium, derivatives having these skeletons, and the like.

Examples of the foregoing R includes methyl, ethyl, propyl, isopropyl, n-butyl, sec-butyl, tert-butyl, hexyl, heptyl, octyl, nanonyl, decanyl, undecanyl and the like.

The foregoing x represents a number of from 0 to 1, and usually it is in a range of 0.2 to 0.8. Those having small x are obtained by oxidation with an oxidizing agent such as benzoyl peroxide, ammonium peroxodisulfate and hydrogen peroxide. Those having large x are obtained by reduction with a reducing agent such as hydrazine, phenylhydrazine, sodium boron hydride, sodium hydride and the like.

Each of $A^1$ to $A^4$ in the present invention is a group independently selected from the group consisting of hydrogen, an alkali metal, ammonium and a substituted ammonium. In other words, $A^1$ to $A^4$ contained in the formula (1) may be the same or different.

Specifically, when polymerization is carried out in the presence of sodium hydroxide, most of $A^1$ to $A^4$ contained in the isolated polymer are sodium. However, when this polymer is treated with an acid solution, it can be converted to a polymer in which most of $A^1$ to $A^4$ have been substituted with hydrogen.

Similarly, polymerization in the presence of ammonia gives a polymer in which most of $A^1$ to $A^4$ are ammonium; polymerization in the presence of trimethylamine gives a polymer in which most of $A^1$ to $A^4$ are trimethylammonium; and polymerization in the presence of quinoline gives a polymer in which most of $A^1$ to $A^4$ are quinolinium.

When basic compounds are used in mixture, $A^1$ to $A^4$ are a mixture of these basic groups.

Specifically, when polymerization is carried out in the presence of both sodium hydroxide and ammonia, $A^1$ to $A^4$ in the isolated polymer are a mixture of sodium and ammonium. When this polymer is treated with a solution containing sodium hydroxide and ammonia, $A^1$ to $A^4$ in the treated polymer, similarly to the above, are a mixture of sodium and ammonium.

The soluble aniline conducting polymer of the present invention may contain a monomer unit(s) as other repeating unit than the one represented by the above formula (1) so far as the solubility, conductivity and other properties of the polymer are not adversely affected. The above monomer unit is at least one member selected from the group consisting of a substituted or unsubstituted aniline, thiophene, pyrrole, phenylene, vinylene, other divalent unsaturated groups and divalent saturated groups. It is preferred that the soluble aniline conducting polymer of the present invention contains a repeating unit of the formula (1) in an amount of 70% or more.

In the present invention, the solubility in alkaline water means that at least 1 wt. % of the aniline conducting polymer can dissolve in a 0.1N aqueous ammonia without producing insoluble products. The solubility in acidic water means that at least 1 wt. % of the aniline conducting polymer can dissolve in a 0.1M aqueous sulfuric acid solution without producing insoluble products. The solubility in neutral water means that at least 1 wt. % of the aniline conducting polymer can dissolve in water itself without producing insoluble products. The solubility in organic solvents means that at least 1 wt. % of the aniline conducting polymer can dissolve in a 0.1N ammoniacal alcohol solution without producing insoluble products.

A method for producing the soluble aniline conducting polymer of the present invention comprises polymerizing at least one compound (1) selected from the group consisting of an acidic group-substituted aniline, its alkali metal salt, an ammonium salt and a substituted ammonium salt with the aid of an oxidizing agent in a solution containing a basic compound (2).

In the method for producing the solution aniline conducting polymer of the present invention, the foregoing acidic group-substituted aniline is preferably represented by the formula (2),

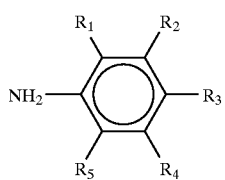

(2)

wherein each of $R_1$, $R_2$, $R_3$, $R_4$ and $R_5$ is selected from the group consisting of hydrogen, a $C_1$–$C_4$ straight-chain or branched alkyl group, a $C_1$–$C_{12}$ straight-chain or branched alkoxy group, an acidic group, a hydroxyl group, a nitro group and a halogen; at least one of $R_1$, $R_2$, $R_3$, $R_4$ and $R_5$ represents an acidic group; and the acidic group referred to herein means a sulfonic acid group or a carboxyl group. Among the compounds represented by the foregoing formula (2), those in which the acidic group has been bonded to the o- or m-position with respect to the amino group give polymers which are more superior in performance such as conductivity, solubility and the like.

The most representative examples of the above acidic group-substituted aniline include a sulfonic acid group-substituted aniline and carboxyl group-substituted aniline. Among these, the sulfonic acid group-substituted aniline is preferred since it tend to show a high conductivity as compared with the carboxyl group-substituted aniline.

The most representative examples of the sulfonic acid group-substituted aniline include aminobenzenesulfonic acids. Specifically, o-, m- and p-aminobenzenesulfonic acids, aniline-2,6-disulfonic acid, aniline-2,5-disulfonic acid, aniline-3,5-disulfonic acid, aniline-2,4-disulfonic acid and aniline-3,4-disulfonic acid are preferably used.

Other sulfonic acid group-substituted anilines include alkyl group-substituted aminobenzenesulfonic acids such as methylaminobenzenesulfonic acid, ethyl-aminobenzenesulfonic acid, n-propylaminobenzenesulfonic acid, isopropylaminobenzenesulfonic acid, n-butylaminobenzenesulfonic acid, sec-butylaminobenzenesulfonic acid, tert-butylaminobenzenesulfonic acid, etc.; hydroxyl group-substituted aminobenzenesulfonic acids, nitro group-substituted aminobenzenesulfonic acids, halogen-substituted aminobenzenesulfonic acids such as fluoroaminobenzenesulfonic acid, chloroaminobenzenesulfonic acid, bromoaminobenzenesulfonic acid and the like. Among these, alkyl group-substituted aminobenzenesulfonic acids and hydroxyl group-substituted aminobenzenesulfonic acids are most preferred in terms of practical use. These sulfonic acid group-substituted anilines may be used alone or in a mixture of their isomers in any weight ratio.

The most representative examples of the carboxyl group-substituted anilines include aminobenzenecarboxylic acids. Specifically, o-, m- and p-aminobenzenescarboxylic acids, aniline-2,6-dicarboxylic acid, aniline-2,5-dicarboxylic acid, aniline-3,5-dicarboxylic acid, aniline-2,4-dicarboxylic acid and aniline-3,4-dicarboxylic acid are preferably used.

Other carboxyl group-substituted anilines include alkyl group-substituted aminobenzenecarboxylic acids such as methylaminobenzenecarboxylic acid, ethylaminobenzenecarboxylic acid, n-propylaminobenzenecarboxylic acid, isopropylaminobenzenecarboxylic acid, n-butylaminobenzenecarboxylic acid, sec-butylaminobenzenecarboxylic acid, tert-butylaminobenzenecarboxylic acid, etc.; hydroxyl group-substituted aminobenzenecarboxylic acids, nitro group-substituted aminobenzenecarboxylic acids, halogen-substituted aminobenzenecarboxylic acids such as fluoroaminobenzenecarboxylic acid, chloroaminobenzenecarboxylic acid, bromoaminobenzenecarboxylic acid and the like. Among these, alkyl group-substituted aminobenzenecarboxylic acids and hydroxyl group-substituted aminobenzenecarboxylic acids are most preferred in terms of practical use. These carboxyl group-substituted anilines may be used alone or in a mixture of their isomers in any weight ratio.

Referring to specific examples of the acidic group-substituted aniline represented by the foregoing formula (2) in more detail, there are given the following:

sulfonic acid group-substituted alkylanilines,
carboxyl group-substituted alkylanilines,
sulfonic acid group-substituted hydroxyanilines,
carboxyl group-substituted hydroxyanilines,
sulfonic acid group-substituted nitroanilines,
carboxyl group-substituted nitroanilines,
sulfonic acid group-substituted fluoroanilines,
carboxyl group-substituted fluoroanilines,
sulfonic acid group-substituted chloroanilines,
carboxyl group-substituted chloroanilines,
sulfonic acid group-substituted bromoanilines and
carboxyl group-substituted bromoanilines.

Specific examples of the position and combination of these substituents will be shown in Table 1.

TABLE 1

| $R_1$ | $R_2$ | $R_3$ | $R_4$ | $R_5$ |
|---|---|---|---|---|
| A | B | H | H | H |
| A | H | B | H | H |
| A | H | H | B | H |
| A | H | H | H | B |
| H | A | B | H | H |
| H | A | H | B | H |
| H | A | H | H | H |
| B | A | H | H | B |
| H | H | A | B | H |
| H | H | A | H | B |
| B | H | A | H | H |
| H | B | A | H | H |
| H | H | H | A | B |
| H | H | B | A | H |
| H | B | H | A | H |
| B | H | H | A | H |
| H | H | H | B | A |
| H | H | B | H | A |

TABLE 1-continued

| R₁ | R₂ | R₃ | R₄ | R₅ |
|---|---|---|---|---|
| H | B | H | H | A |
| B | H | H | H | A | wherein
A represents one member selected from the group consisting of a sulfonic acid group, a carboxyl group, its alkali metal salt, ammonium salt and substituted ammonium salt.
B represents one member selected from the group consisting of an alkyl group (e.g. methyl, ethyl, n-propyl, isopropyl, n-butyl, sec-butyl, tert-butyl), a hydroxyl group, a nitro group and a halogen group (e.g. fluoro, chloro, bromo).
H represents hydrogen.

Further, referring to specific examples of the acidic group-substituted aniline represented by the foregoing formula (2), there are given sulfonic acid group-substituted alkoxyanilines, that is, alkoxyl group-substituted aminobenzenesulfonic acids represented by the formula (3),

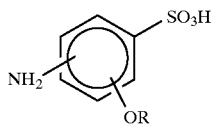

(3)

wherein R represents a $C_1$–$C_{12}$ preferably $C_1$–$C_8$, more preferably $C_1$–$C_4$ straight-chain or branched alkyl group.

Among the compounds represented by the foregoing formula (3), those in which the amino group has been bonded to the o- or m-position with respect to the sulfonic acid group give polymers which are superior in performance such as conductivity, solubility and the like.

The most representative examples of the foregoing alkoxyl group-substituted aminobenzenesulfonic acid include aminoanisolesulfonic acids. Specifically, there are given 2-aminoanisole-3-sulfonic acid, 2-aminoanisole-4-sulfonic acid, 2-aminoanisole-5-sulfonic acid, 2-aminoanisole-6-sulfonic acid, 3-aminoanisole-2-sulfonic acid, 3-aminoanisole-4-sulfonic acid, 3-aminoanisole-5-sulfonic acid, 3-aminoanisole-6-sulfonic acid, 4-aminoanisole-2-sulfonic acid, 4-aminoanisole-3-sulfonic acid and the like. Particularly, 2-aminoanisole-3-sulfonic acid, 2-aminoanisole-4-sulfonic acid, 2-aminoanisole-6-sulfonic acid, 3-aminoanisole-2-sulfonic acid, 3-aminoanisole-4-sulfonic acid and 3-aminoanisole-5-sulfonic acid are preferably used.

Other alkoxyl group-substituted aminobenzenesulfonic acids include 2-amino-4-ethoxybenzenesulfonic acid, 3-amino-4-ethoxybenzenesulfonic acid, 2-amino-4-butoxybenzenesulfonic acid, 3-amino-5-butoxybenzenesulfonic acid, 2-amino-4-propoxybenzenesulfonic acid, 3-amino-6-propoxybenzenesulfonic acid, 2-amino-4-isobutoxybenzenesulfonic acid, 3-amino-4-isobutoxybenzenesulfonic acid, 3-amino-4-tert-butoxybenzenesulfonic acid, 2-amino-4-tert-butoxybenzenesulfonic acid, 2-amino-4-heptoxybenzenesulfonic acid, 3-amino-5-heptoxybenzenesulfonic acid, 2-amino-4-hexoxybenzenesulfonic acid, 3-amino-5-octoxybenzenesulfonic acid, 2-amino-4-nanoxybenzenesulfonic acid, 3-amino-5-decanoxybenzenesulfonic acid, 2-amino-4-undecanoxybenzenesulfonic acid, 3-amino-5-dodecanoxybenzenesulfonic acid and the like.

These alkoxyl group-substituted aminobenzenesulfonic acids may be used alone or in a mixture of their isomers in any weight ratio.

In the formulae (2) and (3), the alkali metals and substituted ammoniums are as defined on the formula (1).

The basic compound (2) used in the present invention may be any compound if it is a compound which forms a salt with the foregoing acidic group-substituted anilines. However, ammonia, aliphatic amines, cyclic saturated amines, cyclic unsaturated amines, inorganic bases, etc. are preferably used. Particularly, aliphatic amines, cyclic saturated amines and cyclic unsaturated amines are preferred.

The aliphatic amines include a compound represented by the formula (6),

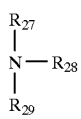

(6)

wherein each of $R_{27}$ to $R_{29}$ is a group independently selected from the group consisting of a $C_1$–$C_4$ alkyl group, $CH_2OH$ and $CH_2CH_2OH$, and a hydroxide compound represented by the formula (7),

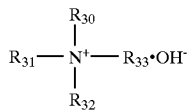

(7)

wherein each of $R_{30}$ to $R_{33}$ is a group independently selected from the group consisting of hydrogen, a $C_1$–$C_4$ alkyl group, $CH_2OH$ and $CH_2CH_2OH$.

Those which are preferably used as the cyclic saturated amine include piperidine, pyrrolidine, morpholine, piperazine, derivatives having the skeletons of these compounds, ammoniumhydroxide compounds of these compounds and derivatives, and the like.

Those which are preferably used as the cyclic unsaturated amine include pyridine, α-picoline, β-picoline, γ-picoline, quinoline, isoquinoline, pyrroline, derivatives having the skeletons of these compounds, ammoniumhydroxide compounds of these compounds and derivatives, and the like.

Those which are preferably used as the inorganic base include metal hydroxides such as sodium hydroxide, potassium hydroxide, lithium hydroxide and the like.

These basic compounds (2) are used in a concentration range of 0.1 mole/liter or more, preferably 0.1 to 10.0 moles/liter, more preferably 0.2 to 8.0 moles/liter. When the concentration is less than 0.1 mole/liter, the yield of the resulting polymer lowers. When it is more than 10.0 moles/liter, the conductivity of the resulting polymer tends to lower.

The foregoing basic compounds (2) can be used in a mixture of any mixing ratio.

The compound (1) (e.g. the above acidic group-substituted anilines) and the basic compound (2) are used in a weight ratio of 1:100 to 100:1, preferably 10:90 to 90:10 of (1) to (2). When the proportion of the basic compound is low, both the reactivity and conductivity lower. On the other hand, when it is high, the acidic group in the resulting polymer and the basic compound tends to form a salt which decreases the conductivity.

The acidic group (3) in the compound (1) (e.g. the above acidic group-substituted anilines) and the basic compound (2) are used in a molar ratio of 1:100 to 100:1, preferably 1:0.25 to 1:20, more preferably 1:0.5 to 1:15 of (3) to (2). When the proportion of the basic compound is low, both the reactivity and conductivity lower. On the other hand, when it is high, the acidic group in the resulting polymer and the basic compound tends to form a salt which decreases the conductivity.

Polymerization or copolymerization is carried out by oxidation polymerization with an oxidizing agent in a solution containing the basic compound.

In this case, preferable examples of the solvent include water, methanol, ethanol, isopropanol, acetonitrile, methyl isobutyl ketone, methyl ethyl ketone, dimethylformamide, dimethylacetamide and the like.

The oxidizing agent is not critical so far as it has a standard electrode potential of 0.6 V or more. Peroxodisulfuric acid, its salts such as ammonium peroxodisulfate, sodium peroxodisulfate, potassium peroxodisulfate, etc. and hydrogen peroxide are preferably used. These compounds are used in an amount of 0.1 to 5 moles, preferably 0.5 to 5 moles based on 1 mole of the monomer. In this case, it is also effective to add a compound of a transition metal (e.g. iron, copper) as a catalyst.

The reaction is preferably carried out in a temperature range of −15° C. to 70° C. and more preferably −5° C. to 60° C. When the reaction temperature is less than −15° C. or more than 70° C., the conductivity of the resulting polymer tends to lower.

Hydrogens in the sulfonic acid groups or carboxyl groups of the polymer produced by the present invention may be replaced by one or more members independently selected from the group consisting of hydrogen, an alkali metal, ammonium and a substituted ammonium. Therefore, there are cases where the selected members consist of a simple member or form a mixture of different ones.

Specifically, when polymerization is carried out in the presence of sodium hydroxide, hydrogens in the sulfonic acid groups or carboxyl groups of the isolated polymer are in the state where most of them have been replaced by sodium.

Similarly, when polymerization is carried out in the presence of ammonia, most of hydrogens in the sulfonic acid groups or carboxyl groups of the polymer are ammonium. In the case of polymerization in the presence of trimethylamine, most of hydrogens are replaced by trimethylammonium, and in the case of polymerization in the presence of quinoline, most of the hydrogens are replaced by quinolinium.

When the basic compounds are used in a mixture, the hydrogens are in the state where they have been mixed with the respective basic groups of these compounds.

Specifically, when polymerization is carried out in the presence of sodium hydroxide and ammonia, hydrogens in the sulfonic acid groups or carboxyl groups of the isolated polymer are in the state where they have been mixed with both sodium and ammonium. Similarly, when the polymer obtained above is treated with a solution containing both sodium hydroxide and ammonia, hydrogens in the sulfonic acid groups or carboxyl groups of the polymer are in the state where they have been mixed with both sodium and ammonium.

The polymer in which a part of the acidic groups described above has formed a salt can be converted to a polymer in which the salt has been replaced by hydrogen, by treating the polymer in acidic solutions.

The acidic solution includes hydrochloric acid, sulfuric acid, p-toluenesulfonic acid, nitric acid and the like.

In the manufacturing method of the present invention, the resulting polymer precipitates from the polymerization solvent, so that the degree of formation of the salt is low. Therefore, a highly conductive, practical polymer can be produced without special need to treat the polymer in the acidic solution.

The thus-obtained soluble aniline conducting polymer having sulfonic acid groups or carboxyl groups bonded to all the aromatic rings has a polymerization degree of 3 to 5000, preferably 5 to 5000, and a weight average molecular weight of about 1,900 to 3,240,000, preferably 3,200 to 3,240,000, more preferably 20,000 to 3,240,000. Without application of additional sulfonation, this polymer can be dissolved in water itself; water containing a base (e.g. ammonia, alkylamine) or a basic salt (e.g. ammonium acetate, ammonium oxalate); water containing an acid (e.g. hydrochloric acid, sulfuric acid); an organic solvent (e.g. methyl alcohol, ethyl alcohol, isopropyl alcohol); or a mixture thereof.

Referring to the solubility in detail, the soluble aniline conducting polymer of the present invention dissolves in aqueous alkali solutions (e.g. 0.1 mole/liter aqueous ammonia) in an amount of 1 wt. % or more; in aqueous acidic solutions (e.g. 0.1 mole/liter aqueous sulfuric acid solution) in an amount of 1 wt. % or more; in aqueous neutral solutions (e.g. water itself) in an amount of 1 wt. % or more; and in organic solvents (e.g. 0.1 mole/liter ammoniacal alcohol solution) in an amount of 1 wt. % or more.

Any of the polymers and copolymers synthesized by the above method is considered to have a structure represented by the following formula (8):

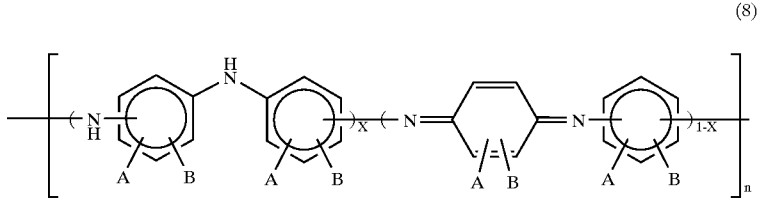

(8)

wherein A is one member selected from the group consisting of an acidic group (e.g. sulfonic acid group, carboxyl group), and its alkali metal salt, ammonium salt and substituted ammonium salt; B is one member selected from the group consisting of hydrogen, a $C_1$–$C_4$ straight-chain or branched alkyl group (e.g. methyl, ethyl, n-propyl, isopropyl, n-butyl, sec-butyl, tert-butyl), a $C_1$–$C_{12}$ straight-chain or branched alkoxyl group, a hydroxyl group, a nitro group, and a halogen group (e.g. fluoro, chloro, bromo); x represents a number of from 0 to 1; and n represents a polymerization degree of from 3 to 5,000.

According to the process of the present invention, the resulting polymer usually has a value of x ranging from 0.2 to 0.8. However, when the oxidation is carried out with an oxidizing agent (e.g. benzoyl peroxide, ammonium peroxodisulfate, hydrogen peroxide), the resulting polymer has a smaller value of x than the above. When the reduction is carried out with a reducing agent (e.g. hydrazine, phenylhydrazine, sodium boron hydride, sodium hydride), the resulting polymer has a larger value of x than the above.

As to the polymer of the present invention obtained with an alkoxyl group-substituted aminobenzenesulfonic acid as a monomer and the conventional polymer, represented by the formulae (5) and (9), respectively, the outline of their solubility characteristics will be shown in Table 2.

TABLE 2

|  | Present polymer (formula 5) | | | Conventional polymer (formula 9) | | |
| --- | --- | --- | --- | --- | --- | --- |
|  | Alkaline | Neutral | Acidic | Alkaline | Neutral | Acidic |
| $SO_3H$ type | o | o | o | o | o | x |
| $SO_3M$ type* | o | o | o | o | x | x | o: Soluble
x: Insoluble
*Means the form of sulfonic acid salt.

The conductive composition of the present invention, an electric conductor produce from the same and methods for producing them will be illustrated below in detail.

Among the water-soluble aniline conducting polymers (a) constituting the above conductive composition and electric conductor, preferred examples are a soluble aniline conducting polymer of the present invention represented by the foregoing structural formula (8), and a polymer derivative having 70% or more of the repeating unit of the formula (8), which is also of the present invention.

For the solvent (b), a component of the conductive composition, used in the present invention, water or organic solvents are used. However, water or a mixed system of water and an organic solvent compatible with water is preferred, and particularly, single use of water is more preferred.

Specific examples of the organic solvent include alcohols (e.g. methanol, ethanol, propanol, isopropanol), ketones (e.g. acetone, methyl isobutyl ketone), cellosolves (e.g. methyl cellosolve, ethyl cellosolve), propylene glycols (e.g. methylpropylene glycol, ethylpropylene glycol), amides (e.g. dimethylformamide, dimethylacetamide), pyrrolidones (N-methylpyrrolidone, N-ethylpyrrolidone), hydroxyesters (e.g. ethyl lactate, methyl lactate, methyl β-methoxyisobutyrate, methyl α-hydroxyisobutyrate, ethyl α-hydroxyisobutyrate, methyl α-methoxyisobutyrate) and the like. Among these, alcohols, propylene gylcols, amides and pyrrolidones are preferably used, and alcohols are more preferably used. By using the above organic solvents or solvents containing them, the coating property of the conductive composition onto substrates can be improved. A preferred rate of the organic solvent used in the mixed system with water is 1:100 to 100:1 of water to organic solvent.

When an acidic compound is added to the solvent (b), the conductivity can be improved by joining of the doping effect of the acidic compound. The acidic compound includes inorganic acids (e.g. sulfuric acid, hydrochloric acid, nitric acid) and organic acids (e.g. p-toluenesulfonic acid, acetic acid, methanesulfonic acid). The rate of weight of the acidic compound added to the solvent (b) is preferably 70:30 to 100:0.01 of solvent to acidic compound.

Any of the solvents and acidic compounds described above can also be used in mixture of their respective two or more members in any weight ratio.

In using the foregoing component (a) and solvent (b), the weight ratio is 0.1 to 20 parts by weight, preferably 0.5 to 15 parts by weight of the former (a) based on 100 parts by weight of the latter (b). When the rate of the component (a) is less than 0.1 part by weight, the conductivity lowers. On the other hand, when it exceeds 20 parts by weight, the solubility, flatness and transparency become poor, and also the conductivity, which has already reached a peak, does not increase further more.

For the polymer compound (c), a component of the composition, used in the present invention, water-soluble polymer compounds and polymer compounds which form emulsion in aqueous systems are used.

Specific examples of the water-soluble polymer compound include polyvinyl alcohols (e.g. polyvinyl alcohol, polyvinyl formal, polyvinyl butyral), polyacrylamides [e.g. polyacrylamide, poly(N-tert-butylacrylamide), polyacrylamide methylpropanesulfonic acid], polyvinyl pyrrolidones, water-soluble alkyd resins, water-soluble melamine resins, water-soluble urea resins, water-soluble phenol resins, water-soluble epoxy resins, water-soluble polybutadiene resins, water-soluble acrylic resins, water-soluble urethane resins, water-soluble acryl/styrene copolymer resins, water-soluble vinyl acetate/acryl copolymer resins, water-soluble polyester resins, water-soluble styrene/maleic acid copolymer resins, water-soluble fluororesins and copolymers thereof.

Specific examples of the polymer compound which forms an emulsion in aqueous systems include aqueous alkyd resins, aqueous melamine resins, aqueous urea resins, aqueous phenol resins, aqueous epoxy resins, aqueous polybutadiene resins, aqueous acrylic resins, aqueous urethane resins, aqueous acryl/styrene copolymer resins, aqueous vinyl acetate resins, aqueous vinyl acetate/acryl copolymer resins, aqueous polyester resins, aqueous styrene/maleic acid copolymer resins, aqueous acryl/silica resins, aqueous fluororesins and copolymers thereof.

These high-molecular compounds may be used alone or in mixture of two or more members in any weight ratio.

The rate of weight of the polymer compound (c) in the conductive composition is 0.1 to 400 parts by weight, preferably 0.5 to 300 parts by weight based on 100 parts by weight of the solvent (b). When the rate of weight is less than 0.1 part by weight, the film-forming property, moldability and strength become poor. On the other hand, when it exceeds 400 parts by weight, the water-soluble aniline conducting polymer (a) lowers in solubility and becomes poor in conductivity.

The transparent conductive polymer film in the electric conductor can be formed by single use of the water-soluble aniline conducting polymer (a). However, by incorporating the foregoing polymer compound (c) into the above polymer (a), the hardness, abrasion resistance and adhesion-to-substrate of the film can be improved.

The weight ratio of the water-soluble aniline conducting polymer (a) and polymer compound (c) is 0.025:100 to 100:0.5, preferably 0.15:100 to 100:1 of (a) to (c).

When the rate of weight of the polymer (a) is outside the above range, the conductivity lowers, and flatness and transparency become poor.

When the rate of weight of the compound (c) is outside the above range, the hardness, abrasion resistance and conductivity of the film lower, and the adhesion-to-substrate of the film becomes poor.

For the nitrogen-containing compound (d), a component of the composition, used in the present invention, the compounds represented by the formulae (9) and (10) are used. The structural formula of amines used is shown by the formula (9),

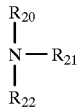  (9)

wherein each of $R_{20}$ to $R_{22}$ independently represents hydrogen, a $C_1$–$C_4$ alkyl group, $CH_2OH$, $CH_2CH_2OH$, $CONH_2$ or $NH_2$. The structural formula of quaternary ammonium salts is shown by the formula (10),

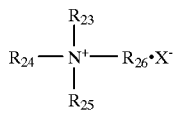  (10)

wherein each of $R_{23}$ to $R_{26}$ independently represents hydrogen, a $C_1$–$C_4$ alkyl group, $CH_2OH$, $CH_2CH_2OH$, $CONH_2$ or $NH_2$; and $X^-$ represents $OH^-$, ½ $SO_4^{2-}$, $NO_3^-$, ½ $CO_3^{2-}$, $HCO_3^-$, ½ $(COO)_2^{2-}$ or $R^1COO$— in which $R^1$ is a $C_1$–$C_3$ alkyl group.

In using the above nitrogen-containing compounds (d), the conductivity can be further improved by using these amines and ammonium salts in mixture. Specifically, there are given the following combinations : $NH_3/(NH_4)_2CO_3$, $NH_3/(NH_4)HCO_3$, $NH_3/(NH_4)HCO_3$, $NH_3/CH_3COONH_4$, $NH_3/(NH_4)_2SO_4$, $N(CH_3)_3/(NH_4)HCO_3$, $N(CH_3)_3/CH_3COONH_4$, $N(CH_3)_3(NH)_2SO_4$ and the like. Any mixing ratio of these compounds may be used, but the ratio of 1:10 to 10:0 of the amines to ammonium salts is preferred.

The rate of weight of the nitrogen-containing compound (d), a component of the composition, is 0 to 30 parts by weight, preferably 0 to 20 parts by weight based on 100 parts by weight of the component (b). When the rate of weight exceeds 20 parts by weight, the solution shows a strong basicity to result in lowering in the conductivity. The pH of the solution can optionally be adjusted by changing the concentration, kind and mixing ratio of the nitrogen-containing compound, and a pH range of 0.1 to 12 can be used.

The conductive composition of the present invention can form a film having good performances by using the mixtures of the components (a) and (b), (a), (b) and (c), or (a), (b), (c) and (d). However, when a surface active agent (e) is further added to the above respective conductive compositions, the flatness, coating property and conductivity are further improved.

The surface active agent (e) include anionic surface active agents, cationic surface active agents, amphoteric surface active agents, nonionic surface active agents and fluorine-containing surface active agents.

The anionic surface active agents include alkylsulfonic acid, alkylbenzenesulfonic acid, alkylcarboxylic acid, alkylnaphthalenesulfonic acid, α-olefinsulfonic acid, dialkylsulfosuccinic acid, α-sulfonated fatty acid, N-methyl-N-oleyltaurine, petroleumsulfonic acid, alkyl sulfate, sulfurized oil and fat, polyoxyethylene alkyl ether sulfuric acid, polyoxyethylene styrenated phenyl ether sulfuric acid, alkylphosphoric acid, polyoxyethylene alkyl ether phosphoric acid, polyoxyethylene alkylphenyl ether phosphoric acid, naphthalenesulfonic acid/formaldehyde condensates, the salts of these compounds and the like.

The cationic surface active agents include primary to tertiary aliphatic amines, quaternary ammonium, tetra-alkylammonium, trialkylbenzylammonium, alkylpyridinium, 2-alkyl-1-alkyl-1-hydroxyethylimidazolinium, N,N-dialkylmorpholinium, poyethylenepolyamine fatty acid amide, polyethylenepolyamine fatty acid amide/urea condensates, their quaternary ammoniums and the salts of these compounds and the like.

The amphoteric surface active agents include betaines such as N,N-dimethyl-N-alkyl-N-carboxymethylammonium betaine, N,N,N-trialkyl-N-sulfoalkyleneammonium betaine, N,N-dialkyl-N,N-bispolyoxyethyleneammonium sulfuric acid ester betaine, 2-alkyl-1-carboxymethyl-1-hydroxyethyl-imidazolinium betaine, etc.; aminocarboxylic acids such as N,N-dialkylaminoalkylenecarboxylic acid salt, etc.; and the like.

The nonionic surface active agents include polyoxyethylene alkyl ether, polyoxyethylene alkylphenyl ether, polyoxyethylene polystyrylphenyl ether, polyoxyethylene-polyoxypropylene glycol, polyoxyethylene-polyoxypropylene alkyl ether, polyhydric alcohol/fatty acid partial ester, polyoxyethylene/polyhydric alcohol/fatty acid partial ester, polyoxyethylene fatty acid ester, polyglycerin fatty acid ester, polyoxyethylenated castor oil, fatty acid diethanol amide, polyoxyethylene alkylamine, triethanolamine/fatty acid partial ester, trialkylamine oxide, and the like.

The fluorine-containing surface active agents include fluoroalkylcarboxylic acid, perfluoroalkylcarboxylic acid, perfluoroalkylbenzenesulfonic acid, perfluoroalkylpolyoxyethylene ethanol and the like. Here, the alkyl groups used are those having preferably 1 to 24 carbon atoms, more preferably 3 to 18 carbon atoms. The above surface active agents may be used in mixture of two or more of them.

In the present invention, when the conductive composition contains the component (c), the nonionic surface active agents are particularly preferably used among the surface active agents described above. Further, among the nonionic surface active agents, polyoxyethylenes represented by the formula (11) are preferably used;

$$HO(CH_2CH_2O)_nR \quad (11)$$

wherein R represents a $C_1$–$C_{24}$ straight-chain or branched alkyl group or a $C_1$–$C_{24}$ straight-chain or branched alkyl-substituted phenyl group, and n represents the number of oxyethylene groups which are a repeating unit, the number being 1 to 100.

Of the polyoxyethylenes, polyoxyethylene alkyl ether and polyoxyethylene alkylphenyl ether are preferably used, and particularly, polyoxyethylene alkylphenyl ether is preferably used.

The number, n, of the oxyethylene units, which are a repeating unit, is preferably 5 to 100, more preferably 10 to 100.

When the conductive composition contains no component (c), the anionic surface active agents are particularly preferably used among the surface active agents described above. Among the anionic surface active agents, those having a sulfonic acid group, a carboxyl group or the like as an anionic group in the molecule are further preferably used.

The surface active agents may be used in mixture of two or more of them.

The rate of weight of the component (e) is 0 to 10 parts by weight, preferably 0 to 5 parts by weight based on 100 parts by weight of the solvent (b). When the rate of weight exceeds 10 parts by weight, there appear such phenomena that the coating property improves, but the flatness lowers, or that the flatness improves, but the conductivity becomes inferior.

The conductive composition of the present invention is prepared by adding to the solvent (b) either one of the following combinations (1), (2), (3) or (4);
(1) the water-soluble aniline conducting polymer (a) alone,
(2) (a) and a polymer compound (c),
(3) (a), (c) and a nitrogen-containing compound (d), and
(4) a surface active agent (e) and either one of (1), (2) or (3), and stirring the mixture at room temperature or with heating to dissolve or mix the components completely. When solid matters precipitate at room temperature, the solution is used after filtration. The electric conductor of the present invention can be formed by coating the conductive composition prepared as described above onto a substrate. When these components are mixed, blade-type stirring-kneading apparatus such as spiral mixers, planetary mixers, dispersers, hybrid mixers, etc. are preferably used. After mixing, it is desirable to carry out dispersion or dissolution thoroughly using ball-type kneading apparatus such as ball mills, vibration mills, sand mills, roll mills and the like.

The conductive composition used to form the electric conductor of the present invention is applied to the surface of a substrate by methods used for common paints. For example, the methods include coating methods such as cast coating, screen coating, etc. with gravure coaters, roll coaters, curtain flow coaters, spin coaters, bar coaters, reverse roll coaters, kiss coaters, fountain coaters, rod coaters, air doctor coaters, knife coaters, blade coaters, etc.; spraying methods such as spray coating, etc.; dipping methods such as dipping, and the like.

It is possible for the transparent conducting polymer film formed with the conductive composition to have a thickness of 0.01 to 1000 μm. However, when the film is thick, the transparent conducting polymer film lowers in the transparency. Accordingly, as thin a film as possible is required. The film thickness is preferably in a range of from 0.01 to 500 μm, more preferably from 0.02 to 100 μm.

In order to obtain the transparent conducting polymer film having the above thickness, it is desirable that the viscosity of the conductive composition is in a range of 100 cp or less, preferably from 1 to 500 cp, and the solid content of the composition is in a range of 0.1 to 80 wt. %.

After the transparent conducting polymer film is formed on the substrate, it may be merely allowed to stand at room temperature as aftertreatment. It is however preferred to apply heat-treatment as after-treatment because the amounts of the residual components (b) and (d) can be more reduced by heating, which makes the conductivity better, i.e. the value of resistance smaller. Although the amount of the component (d) remaining in the electric conductor depends upon the uses of the electric conductor, it is desirable to make the above amount 2 parts by weight or less, preferably 1 part by weight or less based on 100 parts by weight of the conductive film. Further, it is better for the component (b) not to exist substantially. A preferred heat-treatment is heating at 250° C. or less, preferably in a range of 40° C. to 200° C. When the temperature is higher than 250° C., deterioration of the component (a) sometimes causes decrease in conductivity.

As the substrate to be coated with the conductive composition, there are used polymer compounds, woods, papers, ceramics and ceramics films, or glass plates, etc. For example, the polymer compounds and their films include polyethylene, polyvinyl chloride, polypropylene, polystyrene, polyester, ABS resin, AS resin, methacrylic resin, polybutadiene, polycarbonate, polyarylate, polyvinylidenefluoride, polyamide, polyimide, polyaramide, polyphenylene sulfide, polyetheretherketone, polyphenylene ether, polyethernitrile, polyamideimide, polyether sulfone, polysulfone, polyetherimide, polybutyrene terephthalate and their films. These polymer films are used to form a transparent conducting polymer film on at least one surface of them. Therefore, in order to improve the adhesion-to-film of the conductive high-molecular film, it is desirable to apply corona surface treatment or plasma treatment to the surface of these high-molecular films.

The polyaniline polymer of the present invention shows both a high conductivity and an excellent solubility in organic solvents (e.g. alcohols) and aqueous solutions having all pHs ranging over the alkaline, neutral (particularly water itself) and acidic regions, because the polymer has sulfonic acid groups and alkoxyl groups bonded to all of its benzene nuclei.

The conductive composition of the present invention makes it possible to use, as a solvent for it, aqueous solutions having all pHs ranging over the alkaline, neutral (particularly water itself) and acidic regions, because the conductive component, i.e. the water-soluble aniline series conductive polymer, contained in the composition has sulfonic acid groups and alkoxyl groups bonded to all of the nuclei of the component. Therefore, by merely applying the composition to suitable substrates by coating, spraying, casting or dipping and then heat-treatment, there can be obtained a conductive thin film which develops a humidity dependence-free, high conductivity and is excellent in film-forming property, moldability and transparency.

In the present invention, the electric conductor which develops a humidity dependence-free, high conductivity and has only a small dispersion of surface resistance can be obtained by forming a transparent conductive film comprising the water-soluble aniline conducting polymer or the same polymer and the polymer compound and having excellent film-forming property, moldability and transparency on suitable substrates by processing such as coating, spraying, casting, dipping, etc. and then merely allowing the formed film to stand at room temperature or applying heat-treatment to the film.

The present invention could develop a novel polymerization method which breaks the conventional fixed idea that anilines having an acidic group (e.g. sulfonic acid group, carboxyl group) are difficult to undergo chemical oxidation polymerization by themselves. Thus, by causing all of the benzene nuclei to have a sulfonic acid or carboxyl group, the present invention could provide a method for producing a novel polyaniline polymer of high molecular weight having both a high conductivity and an excellent solubility to organic solvents (e.g. alcohols) and aqueous solutions having all pHs ranging over the alkaline, neutral (particularly water itself) and acidic regions.

The resulting polymer could form a film of practical value because it has a high molecular weight as compared with the polymer of acidic group-substituted anilines obtained by the conventional methods.

The present invention will be illustrated in more detail with reference to the following examples, but it is not to be interpreted as being limited to these examples.

IR spectrum was measured with Model 1600 produced by Perkin Elmer Co., and UV visible spectrum was measured with UV-3100 produced by Shimadzu Seisakusho, Ltd.

Measurement of molecular weight distribution and molecular weight (converted to polystyrene basis) was carried out by measurement of GPC with a GPC column for N,N-dimethylformamide. As to the column, three kinds of column for N,N-dimethylformamide were used in connection. For the eluting solution, an N,N-dimethylformamide solution containing 10 mM/liter of triethylamine and 100 mM/liter of lithium bromide was used. Measurement of conductivity (%) was carried out by the four-terminal method, and that of surface resistance was carried out by the two-terminal method.

EXAMPLE 1

One hundred milimoles of 2-aminoanisole-4-sulfonic acid was dissolved in a 4 moles/liter aqueous ammonia solution at 25° C. with stirring, and an aqueous solution-containing 100 mmoles of ammonium peroxodisulfate was added dropwise thereto. After finish of addition, the reaction solution was further stirred at 25° C. for 12 hours. The reaction product was filtered off, washed and dried to obtain 15 g of a polymer powder.

This polymer had a volume resistance of 9.0 Ωcm. The result of molecular weight measurement showed:number average molecular weight, 200,000; weight average molecular weight, 330,000; Z average molecular weight, 383,000; dispersion degree, MW/MN, 1.64 and MZ/MW, 1.16.

FIG. 1 is a chart in the measurement of molecular weight of the conducting polymer synthesized in Example 1.

The polymer was added little by little to each of 10 ml of water, 10 ml of a 0.1 mole/liter aqueous sulfuric acid solution and 10 ml of a 0.1 mole/liter aqueous ammonia. At a time when more polymer became to fail to dissolve, each solution was filtered, and the amount dissolved was measured to find that the solubility of the conducting polymer synthesized in Example 1 was as follows:

| water | 210 mg/ml |
|---|---|
| 0.1 mole/liter aqueous sulfuric acid solution | 205 mg/ml |
| 0.1 mole/liter aqueous ammonia | 190 mg/ml. |

Three parts by weight of the above polymer was dissolved in 100 parts by weight of a 0.2 mole/liter aqueous sulfuric acid solution at room temperature with stirring to prepare a conductive composition (solvent:aqueous sulfuric acid solution).

The solution thus obtained [type: (a)+(b)] was coated onto a glass substrate by the spin coating method and dried at 100° C. A film having a thickness of 0.1 µm, a smooth surface and a surface of $3.5 \times 10^6$ Ω/o, was obtained.

EXAMPLE 2

One hundred milimoles of 2-aminoanisole-4-sulfonic acid was dissolved in a 4 moles/liter aqueous trimethylamine solution at 4° C. with stirring, and an aqueous solution containing 100 mmoles of ammonium peroxodisulfate was added dropwise thereto. After finish of addition, the reaction solution was further stirred at 25° C. for 6 hours. The reaction product was filtered off, washed and dried to obtain 12 g of a polymer powder.

This polymer was added to an acetone solution containing 1 mole/liter of PTS, and after stirring for 1 hour, the reaction product was filtered off, washed and dried to obtain 10 g of the powder of a sulfonic acid group-free polymer.

This polymer had a volume resistance of 5.5 Ωm.

Figure 2:
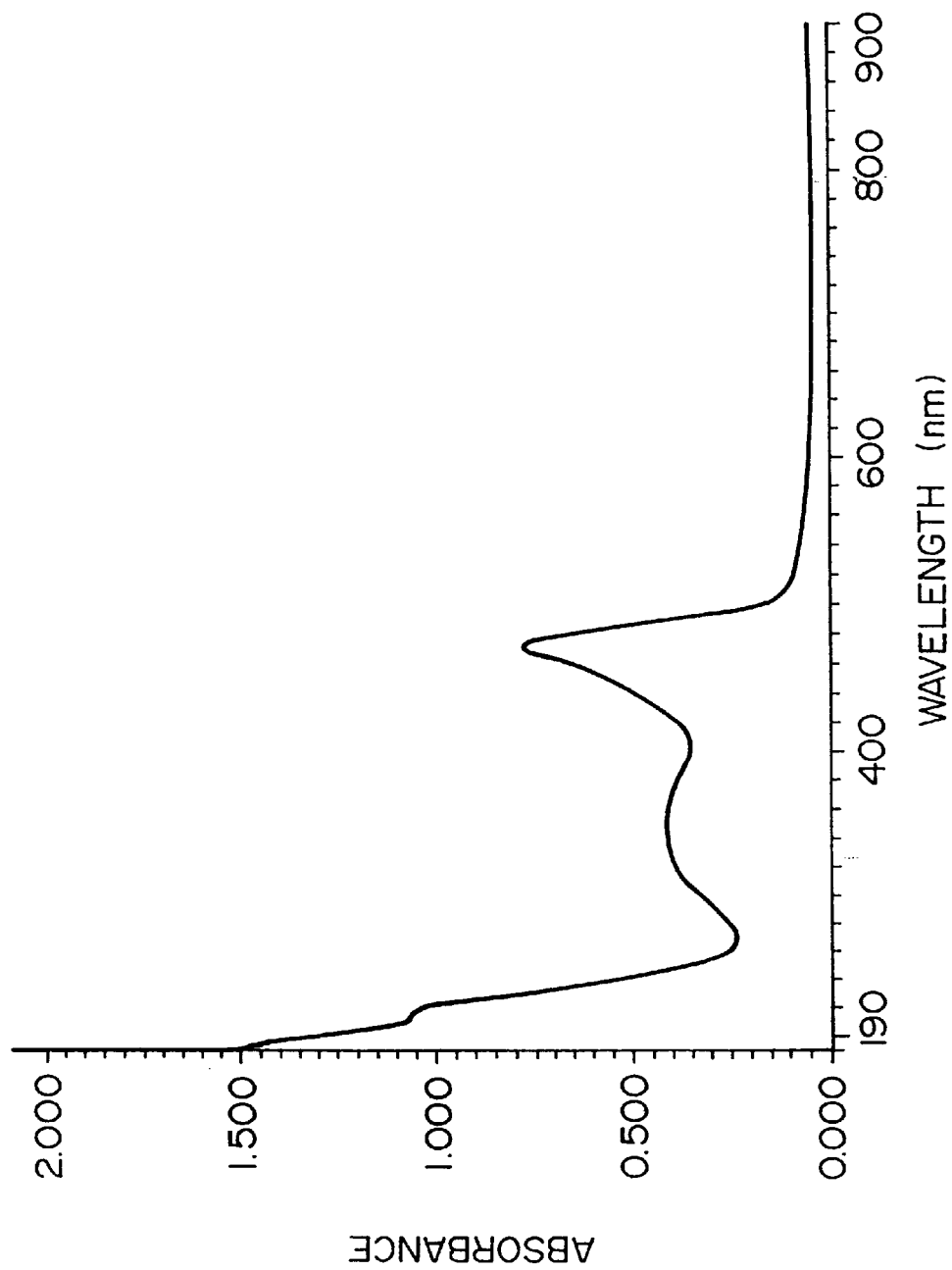
FIG. 2 is a UV-visible spectrum measured in a range of from 190 nm to 900 nm of the conducting polymer synthesized in Example 2 in a 0.1 mole/liter aqueous sulfuric acid solution.
Figure 3:
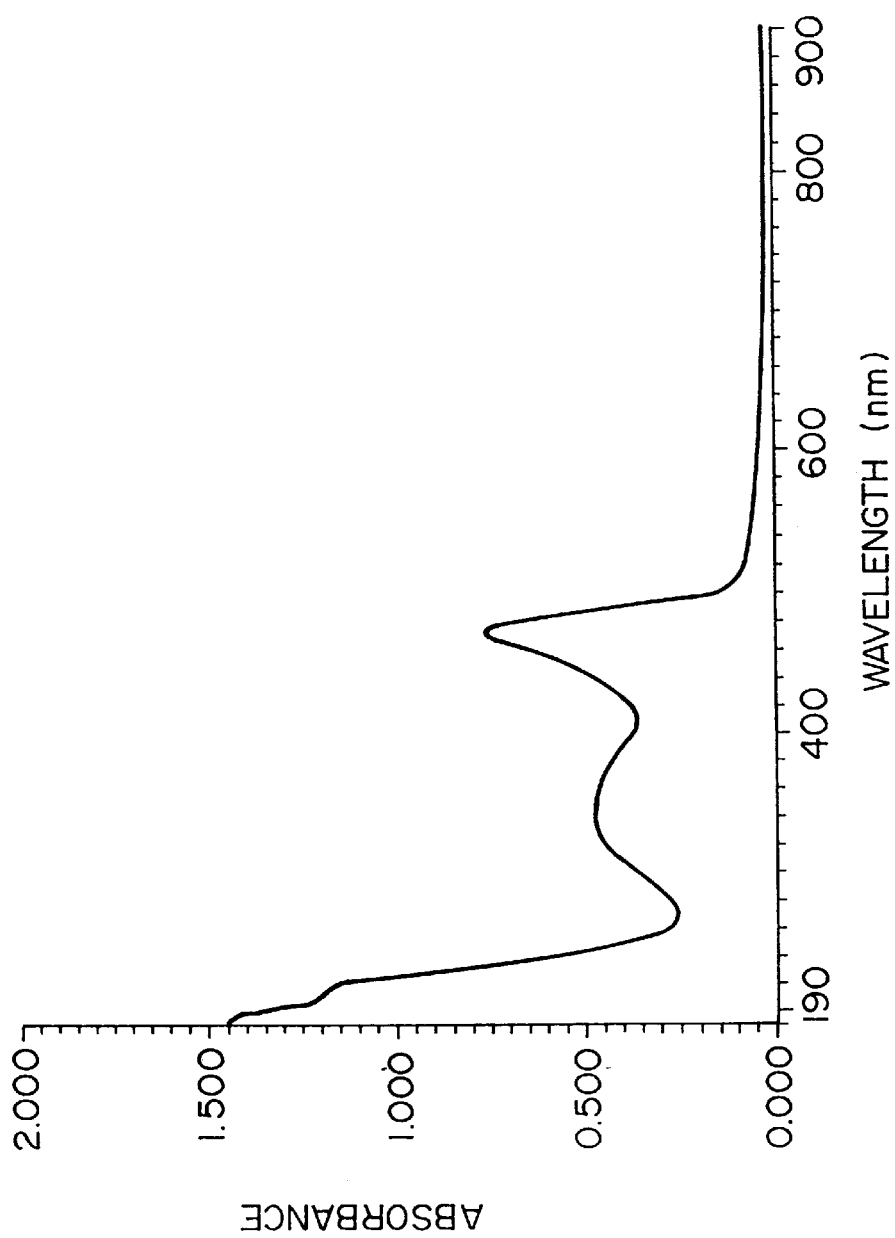
FIG. 3 is a UV-visible spectrum measured in a range of from 190 nm to 900 nm of the conductive polymer synthesized in Example 2 in an aqueous solution.
Figure 4:
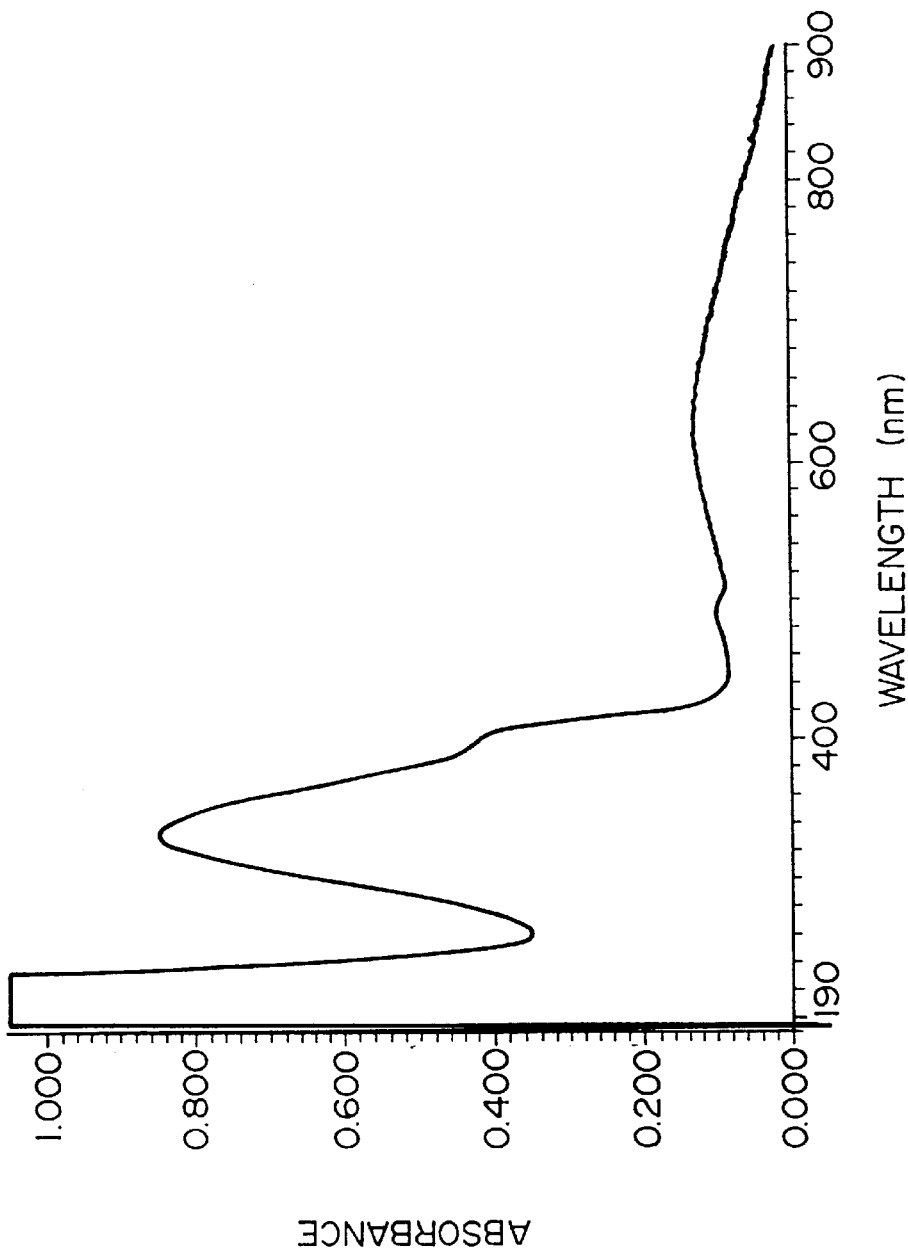
FIG. 4 is a UV-visible spectrum measured in a range of from 190 nm to 900 nm of the conductive polymer synthesized in Example 2 in a 0.2 mole/liter aqueous ammonia solution.
Figure 5:
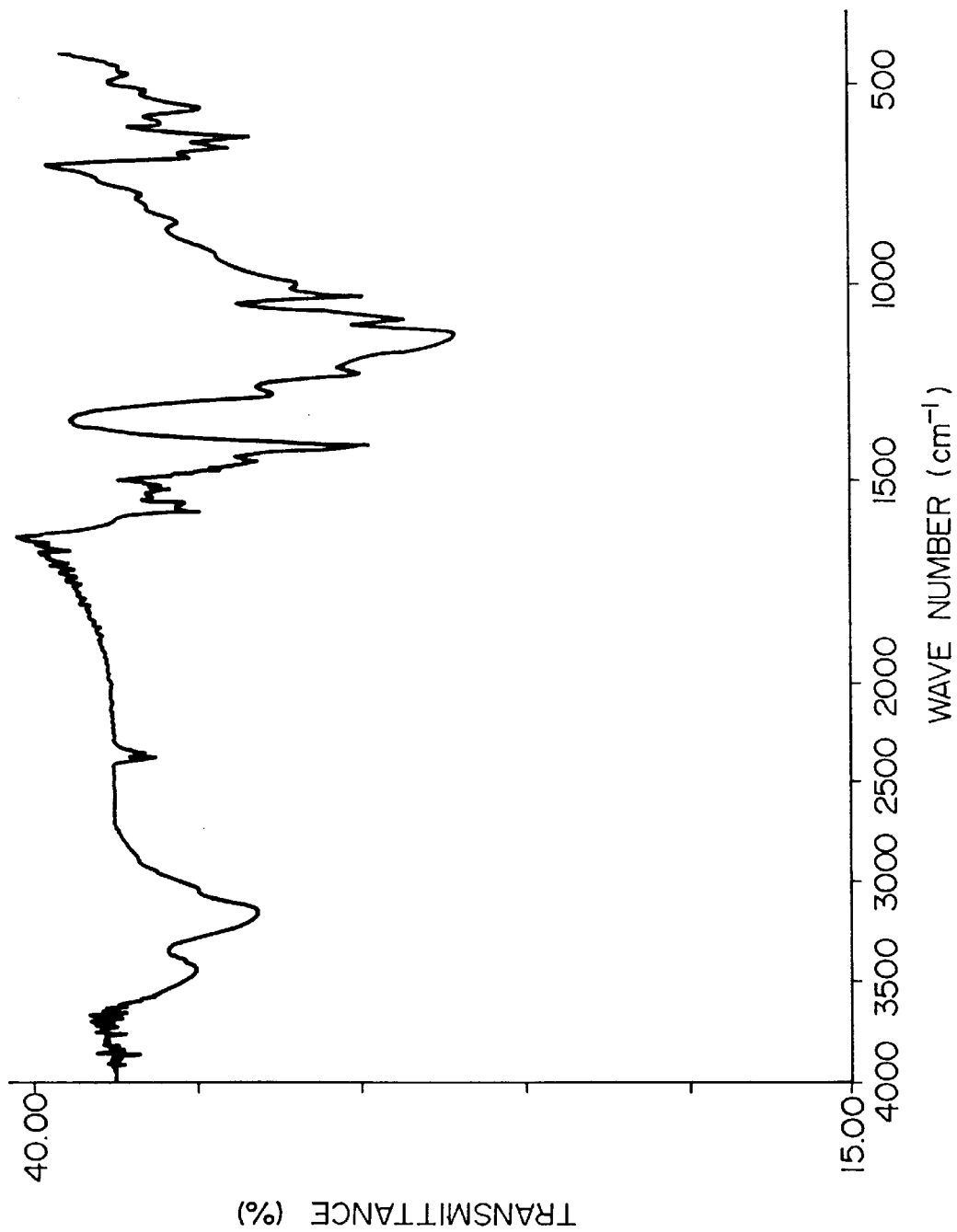
FIG. 5 shows an IR spectrum of the conductive polymer (sulfonic acid group-free type) synthesized in Example 2.

FIG. 2 is the UV visible spectrum from 190 nm to 900 nm of the conducting polymer synthesized in Example 2 in a 0.1 mole/liter aqueous sulfuric acid solution. FIG. 3 is the UV visible spectrum from 190 nm to 900 nm of the conducting polymer synthesized in Example 2 in an aqueous solution. FIG. 4 is the UV visible spectrum from 190 nm to 900 nm of the conducting polymer synthesized in Example 2 in a 0.2 mole/liter aqueous ammonia solution. FIG. 5 shows the IR spectrum of the conducting polymer (sulfonic acid group-free type) synthesized in Example 2.

The assignment of the IR spectrum is as follows:

sulfonic acid group: absorption in the vicinity of 1120, 1020 cm$^{-1}$ ammonium salt of sulfonic acid group: absorption in the vicinity of 1400 cm$^{-1}$.

skeleton of polymer: absorption in the vicinity of 1500 cm$^{-1}$.

One part by weight of the above polymer was dissolved in 100 parts by weight of water at room temperature with stirring to prepare a conductive composition. Since the pH of the composition was about 3.5, it is presumed that about 80% or more of the sulfonic acid groups in the polymer is in a free state.

The solution thus obtained (solvent: water itself) [type, (a)+(b)] was coated onto a glass substrate by the casting method and dried at 100° C. A film having a thickness of 0.1 µm, a smooth surface and a surface resistance of $6.0 \times 10^7$ Ω/o, was obtained.

0.05 Part by weight of PTS (p-toluenesulfonic acid), an acidic compound, was dissolved in the above conductive composition with stirring to prepare a conductive composition.

The solution thus obtained (solvent: aqueous acidic solution) was coated onto a PET film by the casting method and dried at 70° C. A film having a thickness of 0.5 µm, a smooth surface and a surface resistance of $1.0 \times 10^7$ Ω/o, was obtained.

EXAMPLE 3

One hundred milimoles of 2-aminoanisole-4-sulfonic acid was dissolved in a 4 moles/liter aqueous quinoline solution at 4° C. with stirring, and an aqueous solution containing 100 mmoles of ammonium peroxodisulfate was added dropwise thereto. After finish of addition, the reaction solution was further stirred at 25° C. for 12 hours. The reaction product was filtered off, washed and dried to obtain 16 g of a polymer powder.

This polymer had a volume resistance of 11.0 Ωcm.

Three parts by weight of the above polymer and 30 parts by weight of a urethane resin which forms emulsion in an aqueous system (ADEKABONTITER-232 produced by Asahi Denka Kogyo Co., Ltd.) were dissolved in 100 parts by weight of water at room temperature with stirring to prepare a conductive composition. Since the pH of this composition was about 6.0, it is presumed that about 20% or more of the sulfonic acid groups in the polymer forms a salt (solvent: water itself).

The solution thus obtained was coated onto a PET film by the spin coating method and dried at 8° C. A film having a thickness of 0.1 µm, a smooth surface and a surface resistance of $6.0 \times 10^6$ Ω/o, was obtained.

The solution thus obtained [type: (a)+(b)+(c)] was coated onto a PET film by the spin coating method and dried at 80° C. A film having a thickness of 0.1 Ωm, a smooth surface and a surface resistance of $1.5 \times 10^6$ Ω/o, was obtained.

EXAMPLE 4

One hundred milimoles of 3-amino-4-ethoxybenzenesulfonic acid was dissolved in a 3 moles/liter aqueous 2-methylpyridine (α-picoline) solution at 25° C. with stirring. Thereafter, an aqueous solution containing 100 mmoles of ammonium peroxodisulfate was added dropwise thereto. After finish of addition, the reaction solution was further stirred at 25° C. for 12 hours. The reaction product was filtered off, washed and dried to obtain 14 g of a polymer powder.

This polymer had a volume resistance of 8.4 Ωcm.

Three parts by weight of the above polymer was dissolved in 100 parts by weight of water/isopropanol (7/3) at room temperature with stirring to prepare a conductive composition.

The solution thus obtained was coated onto a glass substrate by the spin coating method and dried at 120° C. A film having a thickness of 0.1 µm, a smooth surface and a surface resistance of $4.5 \times 10^6$ Ω/o, was obtained.

Three parts by weight of the above polymer, 20 parts by weight of an acryl/styrene resin which forms emulsion in an aqueous system (NICASOL RX-832A produced by Nihon Carbide Kogyo Co., Ltd.) and 1.0 part by weight of ammonia were dissolved in 100 parts by weight of water/isopropyl alcohol (7/3) at room temperature with stirring to prepare a conductive composition (solvent:alkaline aqueous alcohol solution).

The solution thus obtained [type: (a)+(b)+(c)+(d)] was coated onto a glass substrate by the spin coating method and dried at 120° C. The amount of the component (d) remaining in the formed film was 1% or less based on the weight of the film. A film having a thickness of 0.4 µm, a smooth surface and a surface resistance of $5.0 \times 10^6$ Ω/o, was obtained.

EXAMPLE 5

One hundred milimoles of 2-aminoanisole-4-sulfonic acid was dissolved in a 4 moles/liter aqueous triethanolamine solution at 10° C. with stirring, and an aqueous solution containing 100 mmoles of ammonium peroxodisulfate was added dropwise thereto. After finish of addition, the reaction solution was further stirred at 25° C. for 12 hours. The reaction product was filtered off, washed and dried to obtain 12 g of a polymer powder.

This polymer had a volume resistance of 12 Ωcm.

Figure 6:
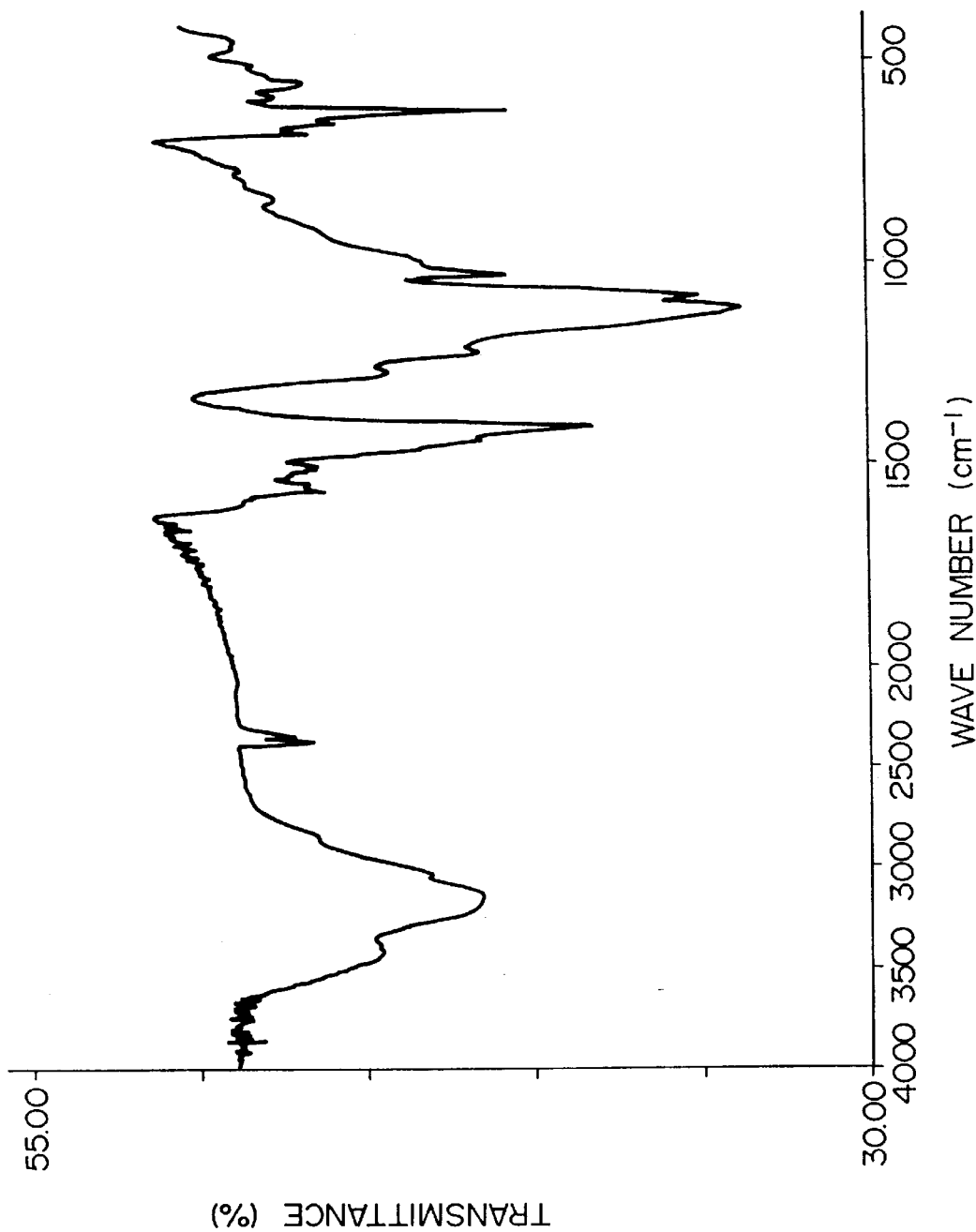
FIG. 6 shows an IR spectrum of the conducting polymer (salt type) synthesized in Example 5.

FIG. 6 shows the IR spectrum of the conductive polymer (salt type) synthesized in Example 5.

Three parts by weight of the above polymer and 100 parts by weight of a water-soluble polyester resin (ARASTAR 300 produced by Arakawa Kagaku Kogyo Co., Ltd.) were dissolved in 100 parts by weight of water at room temperature with stirring to prepare a conductive composition.

The solution thus obtained was coated onto a PET film by means of a gravure coater having a depth of 35 µm and dried at 70° C. A film having a thickness of 0.5 µm, a smooth surface and a surface resistance of $4.5 \times 10^6$ Ω/o, was obtained.

Three parts by weight of the above polymer and 80 parts by weight of a water-soluble polyester resin (ARASTAR 300 produced by Arakawa Kagaku Kogyo Co., ltd.) were dissolved in 100 parts by weight of water at room temperature with stirring to prepare a conductive composition (solvent, water itself).

The solution thus obtained [type: (a)+(b)+(c)] was coated onto a PET film by the casting method and dried at 70° C. A film having a thickness of 0.5 µm, a smooth surface and a surface resistance of $6.5 \times 10^6$ Ω/o, was obtained.

0.05 Part by weight of polyoxyethylene nonylphenyl ether was dissolved in the above conductive composition with stirring to prepare a conductive composition.

The solution thus obtained [type: (a)+(b)+(c)+(d)] was coated onto a PET film by the casting method and dried at 70° C. A film having a thickness of 0.5 µm, a smooth surface and a surface resistance of $3.5 \times 10^6$ Ω/o, was obtained.

EXAMPLE 6

One hundred milimoles of 2-aminoanisole-4-sulfonic acid was dissolved in a 4 moles/liter aqueous piperidine solution at 25° C. with stirring, and an aqueous solution containing 100 mmoles of ammonium peroxodisulfate was added dropwise thereto. After finish of addition, the reaction solution was further stirred at 25° C. for 12 hours. The reaction product was filtered off, washed and dried to obtain 15 g of a polymer powder.

This polymer had a volume resistance of 18 Ωcm.

Two parts by weight of the above polymer was dissolved in 100 parts by weight of a 0.2 mole/liter aqueous ammonia at room temperature with stirring to prepare a conductive composition.

The solution thus obtained was coated onto a PET film by the spin coating method and dried at 80° C. A film having a thickness of 0.1 µm, a smooth surface and a surface resistance of $4.0 \times 10^7$ Ω/o, was obtained.

Two parts by weight of the above polymer and 50 parts by weight of an acrylic resin which forms emulsion in an aqueous system (SAIBINOL EK-1005 produced by Saiden Kagaku Co., Ltd.) were dissolved in 100 parts by weight of water at room temperature with stirring with a high-speed disperser, treated with a sand mill and then filtered through a filter paper (Whatman's filter No. 3) to obtain a conductive composition having a viscosity of 13 cp. The viscosity was measured with a Ubbelohde viscometer (solvent; water itself).

The solution thus obtained [type: (a)+(b)+(c)] was coated onto the whole surface of a polyester film of 75 µm in thickness (LUMIRAR T type produced by Toray Industries, Inc.) by means of a gravure coater having a depth of 35 µm to form a transparent conducting polymer film having a dry film thickness of 0.4 µm. The resulting film was heat-aged (60° C., 72 hours), and its surface resistance was measured to find that the dispersion of the surface resistance was small as described below: average value, $2.5 \times 10^6$ Ω/o; maximum value, $2.7 \times 10^6$ Ω/o; and minimum value, $2.2 \times 10^6$ Ω/o. The above polymer film had a light transmittance of 90% or more, and a haze of 15 or less.

This film was held for 120 hours in a high-temperature, high-humidity atmosphere of 60° C.×95% RH, and its surface resistance was measured to find that it was $3.2 \times 10^6$ Ω/o, showing that the conductivity was maintained.

EXAMPLE 7

One hundred milimoles of 3-amino-4-ethoxybenzenesulfonic acid was dissolved in a 3 moles/liter aqueous sodium hydroxide solution at 4° C. with stirring, and an aqueous solution containing 100 mmoles of ammonium peroxodisulfate was added dropwise thereto. After finish of addition, the reaction solution was further stirred at 25° C. for 6 hours. The reaction product was filtered off, washed and dried to obtain 15 g of a polymer powder.

This compound had a volume resistance of 20 Ωcm. This polymer was added to an acetone solution containing 1 mole/liter of PTS, and after stirring for 1 hour, the reaction product was filtered off, washed and dried to obtain 10 g of the powder of a sulfonic acid group-free polymer.

Three parts by weight of the above polymer was dissolved in 100 parts by weight of water at room temperature with stirring to prepare a conductive composition. This composition had a viscosity of 2.75 cp (at 25° C.). This viscosity was measured with a Ubbelohde viscometer.

Since the pH of the composition was about 3.8, it is presumed that about 80% or more of the sulfonic acid groups in the polymer was in a free state.

The solution thus obtained was coated onto a glass substrate by the spin coating method and dried at 80° C. A film having a thickness of 0.1 $\mu$m, a smooth surface and a surface resistance of $8.0 \times 10^7$ $\Omega/\circ$, was obtained.

Three parts by weight of the above polymer and 0.05 part by weight of dodecylbenzenesulfonic acid were dissolved in 100 parts by weight of water at room temperature with stirring to prepare a conductive composition. This composition had a viscosity of 2.55 cp (25° C.). This viscosity was measured with a Ubbelohde viscometer (solvent; aqueous acidic solution containing an organic acid).

Since the pH of this composition was about 3.2, it is presumed that about 80% or more of the sulfonic acids in the polymer was in a free state.

The solution thus obtained [type: (a)+(b)+(e)] was coated onto a glass substrate by the spin coating method and dried at 80° C. A film having a thickness of 0.1 $\mu$m, a smooth surface and a surface resistance of $6.0 \times 10^6$ $\Omega/\circ$, was obtained.

EXAMPLE 8

One hundred milimoles of 2-aminoanisole-4-sulfonic acid was dissolved in 3 moles/liter aqueous triethylamine solution at 4° C. with stirring, and an aqueous solution containing 100 mmoles of ammonium peroxodisulfate was added dropwise thereto. After finish of addition, the reaction solution was further stirred at 25° C. for 6 hours. The reaction product was filtered off, washed and dried to obtain 14 g of a polymer powder.

This polymer had a volume resistance of 20 $\Omega$cm.

Three parts by weight of the above polymer and 10 parts by weight of polyvinyl alcohol (produced by Denki Kagaku Kogyo Co., Ltd.) were dissolved in 100 parts by weight of water at room temperature with stirring to prepare a conductive composition (solvent; water itself).

The solution thus obtained [type: (a)+(b)+(c)] was coated onto a glass substrate by the spin coating method and dried at 80° C. A film having a thickness of 0.1 $\mu$m, a smooth surface and a surface resistance of $3.0 \times 10^6$ $\Omega/\circ$, was obtained.

EXAMPLE 9

Three parts by weight of the polymer synthesized in Example 8 and 0.5 part by weight of triethylamine were dissolved in 100 parts by weight of isopropyl alcohol at room temperature with stirring to prepare a conductive composition (solvent: organic solvent only).

The solution thus obtained [type: (a)+(b)+(d)] was coated onto a PET film by the spin coating method and dried at 100° C. A film having a thickness of 0.1 $\mu$m, a smooth surface and a surface resistance of $5.0 \times 10^6$ $\Omega/\circ$, was obtained.

EXAMPLE 10

Three parts by weight of the polymer synthesized Example 1, 0.5 part by weight of ammonia and sodium alkylnaphthalenesulfonate (PEREX NB produced by Kao Soap Co., Ltd.) were dissolved in 100 parts by weight of water at room temperature with stirring to prepare a conductive composition.

The solution thus obtained [type: (a)+(b)+(d)+(e)] was coated onto a glass substrate by the spin coating method and dried at 100° C. A film having a thickness of 0.1 $\mu$m, a smooth surface and a surface resistance of $3.9 \times 10^6$ $\Omega/\circ$, was obtained.

EXAMPLE 11

Three parts by weight of the polymer synthesized in Example 2, 80 parts by weight of a polyester resin which forms emulsion in an aqueous system (AY241W produced by Hoechst Japan Co., Ltd.) and 0.5 part by weight of ammonia were dissolved in 100 parts by weight of water at room temperature with stirring to prepare a conductive composition.

The solution thus obtained [type: (a)+(b)+(c)+(d)] was coated onto a glass substrate by the spin coating method and dried at 100° C. A film having a thickness of 0.1 $\mu$m, a smooth surface and a surface resistance of $6.0 \times 10^6$ $\Omega/\circ$, was obtained.

EXAMPLE 12

Three parts by weight of the polymer synthesized in Example 2, 80 parts by weight of a polyester resin which forms emulsion in an aqueous system (AY241W produced by Hoechst Japan Co., Ltd.), 0.5 part by weight of ammonia and 0.1 part by weight of polyoxyethylene-p-oleyl ether were dissolved in 100 parts by weight of water at room temperature with stirring to prepare a conductive composition.

The solution thus obtained [type: (a)+(b)+(c)+(d)+(e)] was coated onto a glass substrate by the spin coating method and dried at 100° C. A film having a thickness of 0.1 $\mu$m, a smooth surface and a surface resistance of $3.5 \times 10^6$ $\Omega/\circ$, was obtained.

COMPARATIVE EXAMPLE 1

One hundred milimoles of 2-aminoanisole-4-sulfonic acid was suspended in water at 4° C. with stirring, and an aqueous solution containing 100 mmoles of ammonium peroxodisulfate was added dropwise thereto. After finish of addition, the reaction solution was further stirred at 25° C. for 12 hours. Thereafter, the reaction solution was vacuum-distilled, and the concentrated product was isolated, washed and dried to obtain 6 g of a polymer powder. This polymer had a volume resistance of $>10^6$ $\Omega$cm.

Three parts by weight of the above polymer was dissolved in 100 parts by weight of water at room temperature with stirring to prepare a conductive composition.

The solution thus obtained was coated onto a PET film by the spin coating method and dried at 80° C. A film having a thickness of 0.1 $\mu$m, a poor film-forming property and a surface resistance of $6.0 \times 10^{12}$ $\Omega/\circ$ or more, was obtained.

COMPARATIVE EXAMPLE 2

One hundred milimoles of 2-aminoanisole-4-sulfonic acid was suspended in a 1 mole/liter aqueous sulfuric acid solution at 25° C. with stirring, and a 1 mole/liter aqueous sulfuric acid solution containing 100 mmoles of ammonium peroxodisulfate was added dropwise thereto. After finish of addition, the reaction solution was further stirred at 25° C. for 12 hours. Thereafter, the reaction solution was vacuum-distilled, and the concentrated product was isolated, washed and dried to obtain 3 g of a polymer powder. This polymer had a volume resistance of $>10^6$ $\Omega$cm.

Three parts by weight of the above polymer was dissolved in 100 parts by weight of water at room temperature with stirring to prepare a conductive composition.

The solution thus obtained was coated onto a glass substrate by the spin coating method, but a film was not formed owing to oligomer.

COMPARATIVE EXAMPLE 3

Sulfonated polyaniline was synthesized as the aniline conducting polymer according to the known method [J. Am. Chem. Soc., (1991), 113, 2665–2666]. The content of the sulfonic group in the polymer was 52% based on the aromatic ring.

Three parts by weight of the above sulfonated polyaniline was mixed with 100 parts by weight of a 0.2 mole/liter aqueous sulfuric acid solution at room temperature to prepare a conductive composition.

The solution thus obtained was coated onto a glass substrate by the spin coating method, but a film was not formed because the sulfonated polyaniline was insoluble in the 0.2 mole/liter aqueous sulfuric acid solution.

Figure 7:
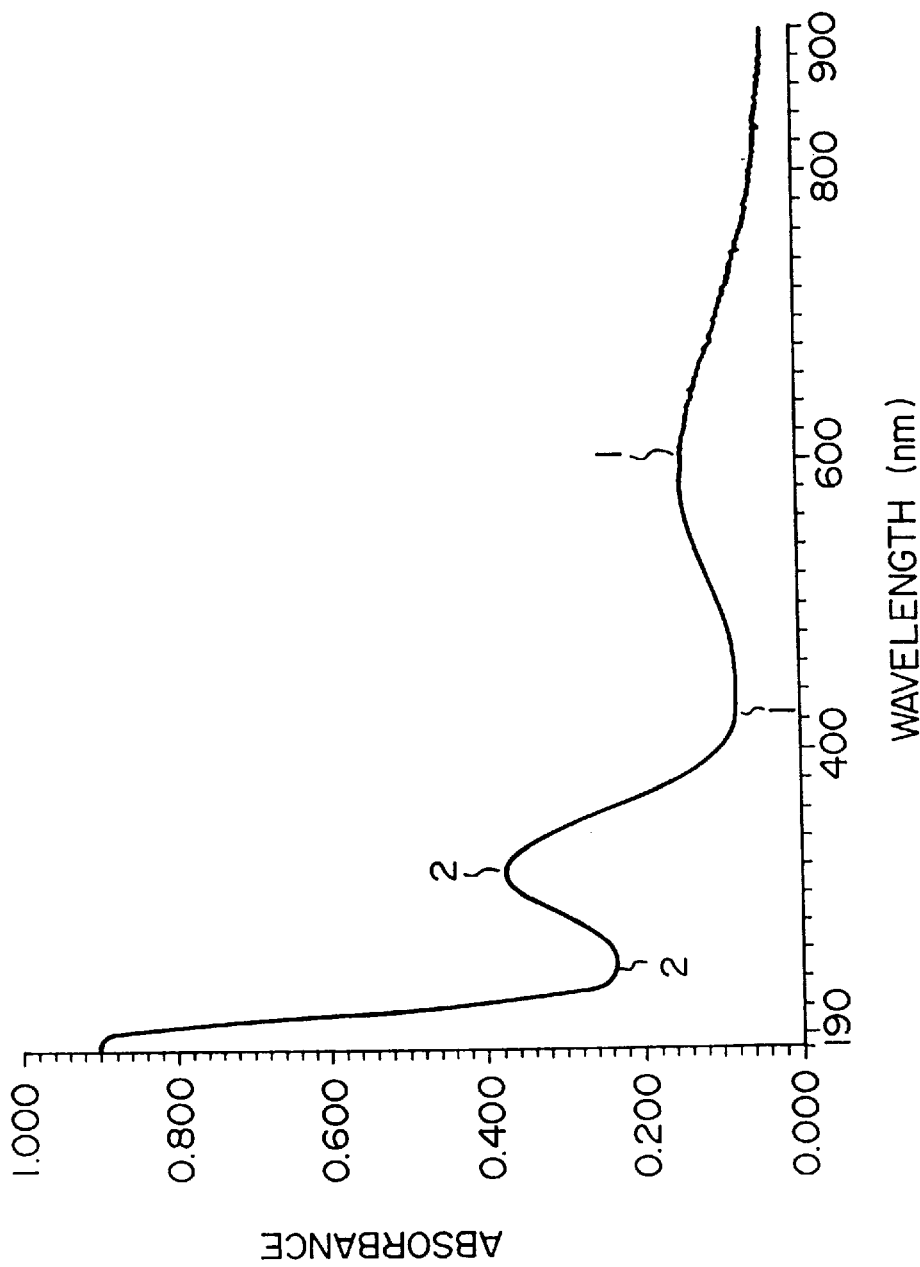
FIG. 7 is a UV-visible spectrum measured in a range of from 190 nm to 900 nm of the conductive polymer synthesized in Comparative Example 3 (conventional method) in a 0.2 mole/liter aqueous ammonia solution.

FIG. 7 is the UV visible spectrum from 190 nm to 900 nm of the aniline conducting polymer synthesized in Comparative Example 3 (conventional method) in a 0.2 mole/liter aqueous ammonia solution.

The polymer synthesized in Comparative Example 3 was insoluble in aqueous solutions and aqueous acidic solutions, so that its UV visible spectrum could not be measured in these solutions.

The solubility of the conducting polymer synthesized in Comparative Example 3 (conventional method) was as follows:

| | |
|---|---|
| water | 0 mg/ml |
| 0.1 mole/liter aqueous sulfuric acid solution | 0 mg/ml |
| 0.1 mole/liter aqueous ammonia | 50 mg/ml. |

COMPARATIVE EXAMPLE 4

Sulfonated polyaniline was synthesized as the aniline conducting polymer according to the known method [J. Am. Chem. Soc., (1991), 113, 2665–2666]. The content of the sulfonic group in the polymer was 52% based on the aromatic ring.

Three parts by weight of the above sulfonated polyaniline and 80 parts by weight of a water-soluble polyester resin (ARASTAR 300 produced by Arakawa Kagaku Kogyo Co., Ltd.) were dissolved in 100 parts by weight of water at room temperature with stirring to prepare a conductive composition.

The solution thus obtained was coated onto a glass substrate by the spin coating method, but a film was not formed because the sulfonated polyaniline was insoluble in the aqueous solution.

COMPARATIVE EXAMPLE 5

A polyaniline having a sulfonic group at the aromatic ring was synthesized as the aniline conducting polymer according to the known method (Japanese Patent Application Kokai No. 5-48540). Ten parts by weight of aniline and 20 parts by weight of 2-aminoanisole-4-sulfonic acid were copolymerized with ammonium peroxodisulfate in an acidic condition containing sulfuric acid, to synthesize a polyaniline having a sulfonic acid group at the aromatic ring. The content of the sulfonic groups in this polyaniline having a sulfonic group was 48%.

Three parts by weight of the above polyaniline having a sulfonic group at the aromatic ring and 8 parts by weight of a water-soluble polyester resin (ARASTAR 300 produced by Arakawa Kagaku Kogyo Co., Ltd.) were dissolved in 100 parts by weight of water at room temperature with stirring to prepare a conductive composition.

The solution thus obtained was coated onto a glass substrate by the spin coating method, but a film was not formed because the polyaniline having a sulfonic group at the aromatic ring was-insoluble in the aqueous solution.

EXAMPLE 13

One hundred milimoles of o-aminobenzenesulfonic acid was dissolved in a 4 moles/liter aqueous ammonia solution at 25° C. with stirring, and an aqueous solution containing 100 mmoles of ammonium peroxodisulfate was added dropwise thereto. After finish of addition, the reaction solution was further stirred at 25° C. for 12 hours, and the reaction product was filtered off, washed and dried to obtain 12 g of a polymer powder. This polymer had a volume resistance of 12.0 Ωcm.

Three parts by weight of the above polymer was dissolved in 100 parts by weight of a 0.2 mole/liter aqueous sulfuric acid solution at room temperature with stirring to prepare a conductive composition. The solution thus obtained was coated onto a glass substrate by the spin coating method and dried at 100° C. A film having a thickness of 0.1 μm, a smooth surface and a surface resistance of $2.5 \times 10^7$ Ω/□, was obtained.

The result of measurement showed: number average molecular weight, 150,000; weight average molecular weight, 190,000; Z average molecular weight, 210,000; and dispersion degree, MW/MN, 1.5, and MZ/MW, 1.3.

The polymer was added little by little to each of 10 ml of water, 10 ml of a 0.1 mole/liter aqueous sulfuric acid solution and 10 ml of a 0.1 mole/liter aqueous ammonia. At a time when more polymer became to fail to dissolve, each solution was filtered, and the amount dissolved was measured to find that the solubility of the conducting polymer synthesized in Example 13 was as follows:

| | |
|---|---|
| water | 230 mg/ml |
| 0.1 mole/liter aqueous sulfuric acid solution | 225 mg/ml |
| 0.1 mole/liter aqueous ammonia | 200 mg/ml. |

Figure 8:
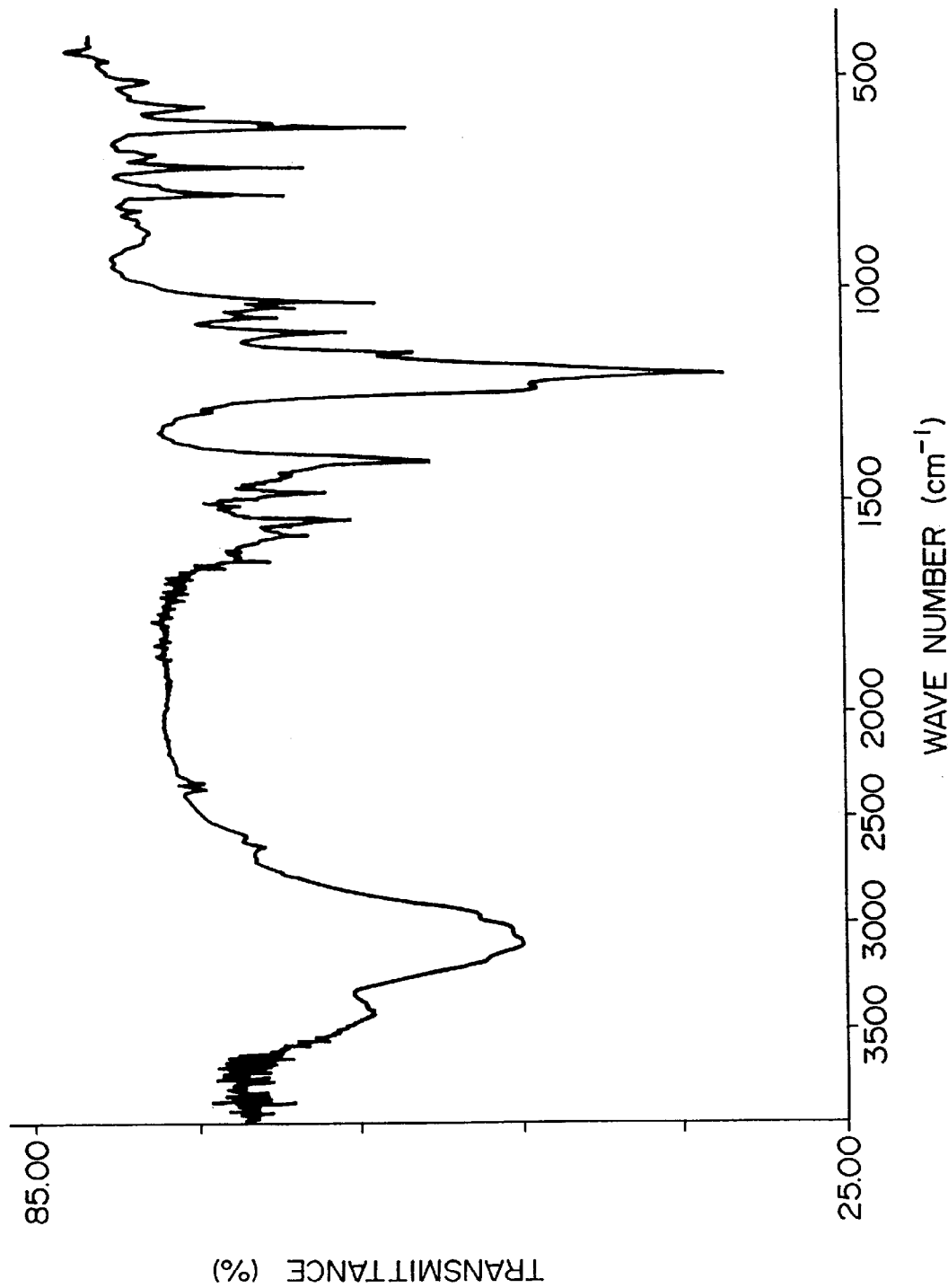
FIG. 8 shows an IR spectrum of the conductive polymer synthesized in Example 13.

FIG. 8 shows the IR spectrum of the conducting polymer synthesized in Example 13. The assignment of the IR spectrum is as follows:

sulfonic group: absorption in the vicinity of 1120, 1020 $cm^{-1}$.

ammonium salt of sulfonic group: absorption in the vicinity of 1400 $cm^{-1}$.

skeleton of polymer: absorption in the vicinity of 1500 $cm^{-1}$.

EXAMPLE 14

One hundred milimoles of 3-methyl-6-aminobenzenesulfonic acid was dissolved in a 4 moles/liter aqueous trimethylamine solution at 4° C. with stirring, and an aqueous solution containing 100 mmoles of ammonium peroxodisulfate was added dropwise thereto. After finish of addition, the reaction solution was further stirred at 25° C. for 6 hours, and the reaction product was filtered off, washed and dried to obtain 10 g of a polymer powder.

This polymer was added to an acetone solution containing 1 mole/liter of p-toluenesulfonic acid (PTS), and after stirring for 1 hour, the reaction product was filtered off, washed and dried to obtain 18 g of the powder of a sulfonic group-free polymer. This polymer had a volume resistance of 12.5 Ωcm.

One part by weight of the above polymer was dissolved in 100 parts by weight of water at room temperature with stirring to prepare a conductive composition. Since the pH of the composition was about 3.5, it is presumed that about 80% or more of the sulfonic groups in the polymer was in a free state. The solution thus obtained was coated onto a glass substrate by the casting method and dried at 100° C. A film having a thickness of 0.1 μm, a smooth surface and a surface resistance of $5.0 \times 10^6$ Ω/o, was obtained.

EXAMPLE 15

One hundred milimoles of 2-carboxyaniline (anthranilic acid) was dissolved in a 4 moles/liter aqueous quinoline solution at 4° C. with stirring, and an aqueous solution containing 100 mmoles of ammonium peroxodisulfate was added dropwise thereto. After finish of addition, the reaction solution was further stirred at 25° C. for 12 hours, and the reaction product was filtered off, washed and dried to obtain 11 g of a polymer powder. This polymer had a volume resistance of 45 Ωcm.

Three parts by weight of the above polymer was dissolved in 100 parts by weight of water at room temperature with stirring to prepare a conductive composition.

Since the pH of the composition was about 6.0, it is presumed that about 20% or more of the carboxyl groups in the polymer formed a salt.

The solution thus obtained was coated onto a PET film by the spin coating method and dried at 80° C. A film having a thickness of 0.1 μm, a smooth surface and a surface resistance of $3.0 \times 10^7$ Ω/o, was obtained.

EXAMPLE 16

One hundred milimoles of 3-hydroxyanthranilic acid was dissolved in a 3 moles/liter aqueous 2-methylpyridine (α-picoline) solution at 25° C. with stirring, and an aqueous solution containing 100 mmoles of ammonium peroxodisulfate was added dropwise thereto. After finish of addition, the reaction solution was further stirred at 25° C. for 12 hours, and the reaction product was filtered off, washed and dried to obtain 11 g of a polymer powder. This polymer had a volume resistance of 37 Ωcm.

Three parts by weight of the above polymer was dissolved in 100 parts by weight of water/isopropyl alcohol (7/3) at room temperature with stirring to prepare a conductive composition The solution thus obtained was coated onto a glass substrate by the spin coating method and dried at 120° C. A film having a thickness of 0.1 μm, a smooth surface and a surface resistance of $7.0 \times 10^6$ Ω/o, was obtained.

EXAMPLE 17

One hundred milimoles of 4-nitroanthranilic acid was dissolved in a 4 moles/liter aqueous triethanolamine solution at 10° C. with stirring, and an aqueous solution containing 100 mmoles of ammonium peroxodisulfate was added dropwise thereto. After finish of addition, the reaction solution was further stirred at 25° C. for 12 hours, and the reaction product was filtered off, washed and dried to obtain 9.5 g of a polymer powder. This polymer had a volume resistance of 50 Ωcm.

Three parts by weight of the above polymer and 100 parts by weight of a water-soluble polyester resin (ARASTAR 300 produced by Arakawa Kagaku Kogyo Co., Ltd.) were dissolved in 100 parts by weight of water at room temperature with stirring to prepare a conductive composition.

The solution thus obtained was coated onto a PET film by means of a gravure coater having a depth of 35 μm and dried at 70° C. A film having a thickness of 0.5 μm, a smooth surface and a surface resistance of $1.5 \times 10^7$ Ω/o, was obtained.

EXAMPLE 18

One hundred milimoles of m-nitroanilinesulfonic acid was dissolved in a 4 moles/liter aqueous piperidine solution at 25° C. with stirring, and an aqueous solution containing 100 mmoles of ammonium peroxodisulfate was added dropwise thereto. After finish of addition, the reaction solution was further stirred at 25° C. for 12 hours, and the reaction product was filtered off, washed and dried to obtain 6 g of a polymer powder. This polymer had a volume resistance of 15 Ωcm.

Two parts by weight of the above polymer was dissolved in 100 parts by weight of a 0.2 mole/liter aqueous ammonia at room temperature with stirring to prepare a conductive composition.

The solution thus obtained was coated onto a PET film by the spin coating method and dried at 80° C. A film having a thickness of 0.1 μm, a smooth surface and a surface resistance of $1.0 \times 10^7$ Ω/o, was obtained.

EXAMPLE 19

One hundred milimoles of 2-chloro-5-aminobenzenesulfonic acid was dissolved in a 3 moles/liter aqueous sodium hydroxide solution at 4° C. with stirring, and an aqueous solution containing 100 mmoles of ammonium peroxodisulfate was added dropwise thereto. After finish of addition, the reaction solution was further stirred at 25° C. for 6 hours, and the reaction product was filtered off, washed and dried to obtain 6 g of a polymer powder. This polymer had a volume resistance of 20 Ωcm. This polymer was added to an acetone solution containing 1 mole/liter of p-toluenesulfonic acid (PTS), and after stirring for 1 hour, the reaction product was filtered off, washed and dried to obtain 4 g of the powder of a sulfonic group-free polymer.

Three parts by weight of the above polymer was dissolved in 100 parts by weight of water at room temperature with stirring to prepare a conductive composition. This composition had a viscosity of 4.7 cp (at 25° C.). This viscosity was measured with a Ubbelohde viscometer.

Since the pH of the composition was about 3.8, it is presumed that about 80% or more of the sulfonic groups in the polymer was in a free state.

The solution thus obtained was coated onto a glass substrate by the spin coating method and dried at 80° C. A film having a thickness of 0.1 μm, a smooth surface and a surface resistance of $8.5 \times 10^6$ Ω/o, was obtained.

COMPARATIVE EXAMPLE 6

One hundred milimoles of o-aminobenzenesulfonic acid was suspended in water at 4° C. with stirring, and an aqueous solution containing 100 mmoles of ammonium peroxodisulfate was added dropwise thereto. After finish of addition, the reaction solution was further stirred at 25° C. for 12 hours. The reaction solution was vacuum-distilled, and the concentrated product was isolated, washed and dried to obtain 6 g of a polymer powder. This polymer had a volume resistance of $>10^6$ Ωcm.

Three parts by weight of the above polymer powder was dissolved in 100 parts by weight of water at room temperature with stirring to prepare a conductive composition.

The solution thus obtained was coated onto a PET film by the spin coating method, but a film was not formed.

COMPARATIVE EXAMPLE 7

One hundred milimoles of 2-carboxyaniline (anthranilic acid) was suspended in a 1 mole/liter aqueous sulfuric acid solution at 25° C. with stirring, and a 1 mole/liter aqueous sulfuric acid solution containing 100 mmoles of ammonium peroxodisulfate was added dropwise thereto. After finish of addition, the reaction solution was further stirred at 25° C. for 12 hours. Thereafter, the reaction solution was vacuum-distilled, and the concentrated product was isolated, washed and dried to obtain 3 g of a polymer powder. This polymer had a volume resistance of >$10^6$ Ωcm.

Three parts by weight of the above polymer was dissolved in 100 parts by weight of water at room temperature with stirring to prepare a conductive composition.

The solution thus obtained was coated onto a glass substrate by the spin coating method, but a film was not formed.

COMPARATIVE EXAMPLE 8

One hundred milimoles of p-aminobenzenesulfonic acid and 40 mmoles of aniline were suspended in a 1 mole/liter aqueous sulfuric acid solution at 4° C. with stirring, and a 1 mole/liter aqueous sulfuric acid solution containing 100 mmoles of ammonium peroxodisulfate was added dropwise thereto. After finish of addition, the reaction solution was further stirred at 25° C. for 12 hours, and the reaction product was filtered off, washed and dried to obtain 4.3 g of a polymer powder. This polymer powder had a volume resistance of 15 Ωcm.

Three parts by weight of the above aniline conducting polymer and 100 parts by weight of water were mixed at room temperature to prepare a conductive composition.

The solution thus obtained was coated onto a glass substrate by the spin coating method, but a film was not formed because this polymer was insoluble in water.

The solubility of the conductive polymer synthesized in Comparative Example 8 was as follows:

| | |
|---|---|
| water | 0 mg/ml |
| 0.1 mole/liter aqueous sulfuric acid solution | 0 mg/ml |
| 0.1 mole/liter aqueous ammonia | 3 mg/ml. |

What is claimed is:

1. A method for producing aniline conducting polymer comprising polymerizing at least one compound (1) selected from the group consisting of an acidic group-substituted aniline, an alkali metal salt of acidic group-substituted aniline, an ammonium salt of acidic group-substituted aniline and a substituted ammonium salt of acidic group-substituted aniline, in a solution containing a basic compound (2) using an oxidizing agent.

2. A method according to claim 1, wherein said acidic group-substituted aniline is represented by the formula (2):

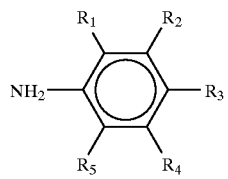

(2)

wherein each of $R_1$, $R_2$, $R_3$, $R_4$ and $R_5$ is selected from the group consisting of hydrogen, a $C_1$–$C_4$ straight-chain or branched alkyl group, a $C_1$–$C_{12}$ straight-chain or branched alkoxy group, an acidic group, a hydroxyl group, a nitro group and a halogen; at least one of them represents an acidic group; and the acidic group referred to herein means a sulfonic acid group or a carboxyl group.

3. A method according to claim 1, wherein an equivalent ratio of the acidic group (3) in said compound (1) to said basic compound (2) is 1:100 to 100:1.

4. A method according to claim 1, wherein said acidic group-substituted aniline is selected from the group consisting of a sulfonic acid group-substituted alkylaniline, a carboxyl group-substituted alkylaniline, a sulfonic acid group-substituted hydroxyaniline, a carboxyl group-substituted hydroxyaniline, a sulfonic acid group-substituted nitroaniline, a carboxyl group-substituted nitroaniline, a sulfonic acid group-substituted fluoroaniline, a carboxyl group-substituted fluoroaniline, a sulfonic acid group-substituted chloroaniline, a carboxyl group-substituted chloroaniline, a sulfonic acid group-substituted bromoaniline and a carboxyl group-substituted bromoaniline.

5. A method according to claim 4, wherein the alkali metal salt of said acidic group-substituted aniline is selected from the group consisting of the lithium salt, sodium salt and potassium salt.

6. A method according to claim 4, wherein the substituted ammonium salt of said acidic group-substituted aniline is selected from the group consisting of an aliphatic ammonium salt, a cyclic saturated ammonium salt and a cyclic unsaturated ammonium salt.

7. A method according to claim 6, wherein said aliphatic ammonium salt is a salt of a compound represented by the formula:

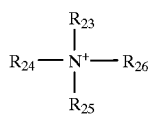

wherein each of $R_{23}$ to $R_{26}$ is a group independently selected from the group consisting of hydrogen, a $C_1$–$C_4$ alkyl group, $CH_2OH$ and $CH_2CH_2OH$.

8. A method according to claim 6, wherein said cyclic saturated ammonium salt is a salt of a compound selected from the group consisting of piperidinium, pyrrolidinium, morpholinium, piperazinium and derivatives having the skeleton of these compounds.

9. A method according to claim 6, wherein said cyclic unsaturated ammonium salt is a salt of a compound selected from the group consisting of pyridinium, α-picolinium, β-pioclinium, γ-picolinium, quinolinium, isoquinolinium, pyrrolinium and derivatives having the skeleton of these compounds.

10. A method according to claim 1, wherein said basic compound (2) is selected from the group consisting of ammonia, an aliphatic amine, a cyclic saturated amine, a cyclic unsaturated amine and an inorganic base.

11. A method according to claim 10, wherein said aliphatic amine is a compound represented by the formula:

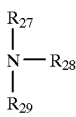

wherein each of $R_{27}$ to $R_{29}$ is a group independently selected from the group consisting of a $C_1$–$C_4$ alkyl group, $CH_2OH$ and $CH_2CH_2OH$, or a hydroxide compound represented by the formula:

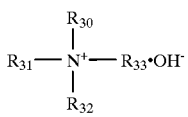

wherein each of $R_{30}$ to $R_{33}$ is a group independently selected from the group consisting of hydrogen, a $C_1$–$C_4$ alkyl group, $CH_2OH$ and $CH_2CH_2OH$.

12. A method according to claim 10, wherein said cyclic saturated amine is selected from the group consisting of piperidine, pyrrolidine, morpholine, piperazine, derivatives having the skeleton of these compounds and an ammonium hydroxide compound thereof.

13. A method according to claim 10, wherein said cyclic unsaturated amine is selected from the group consisting of pyridine, α-picoline, β-picoline, γ-picoline, quinoline, isoquinoline, pyrroline, derivatives having the skeleton of these compounds and a ammonium hydroxide compound thereof.

14. A method according to claim 10, wherein said inorganic base is selected from the group consisting of sodium hydroxide, potassium hydroxide and lithium hydroxide.

15. A method according to claim 1, wherein a concentration of said basic compound (2) is 0.1 to 10.0 moles/liter.

16. A method according to claim 1, wherein a weight ratio of said compound (1) to said compound (2) is 1:100 to 100:1.

17. A method according to claim 16, wherein a weight ratio of said compound (1) to said compound (2) is 10:90 to 90:10.

18. A method according to claim 1, wherein a molar ratio of the acidic group (3) in said compound (1) to said basic compound (2) is 1:100 to 100:1.

19. A method according to claim 18, wherein a molar ratio of the acidic group (3) in said compound (1) to said basic compound (2) is 1:0.25 to 1:20.

20. A method according to claim 19, wherein a molar ratio of the acidic group (3) in said compound (1) to said basic compound (2) is 1:0.5 to 1:15.

21. A method according to claim 1, wherein said acidic group-substituted aniline is an alkoxyl group-substituted aminobenzene-sulfonic acid represented by the formula (3):

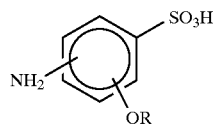

(3)

wherein R represents a $C_1$–$C_{12}$ straight-chain or branched alkyl group.

22. A method according to claim 21, wherein said acidic group-substituted aniline is an alkoxy group-substituted aminobenzenesulfonic acid selected from the group consisting of a compound represented by the formula (4):

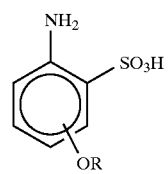

(4)

wherein R represents a $C_1$–$C_{12}$ straight-chain or branched alkyl group, and a compound represented by the formula (5):

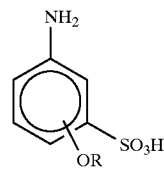

(5)

wherein R represents a $C_1$–$C_{12}$ straight-chain or branched alkyl group.

* * * * *